(12) United States Patent
Muraoka et al.

(10) Patent No.: US 7,578,563 B2
(45) Date of Patent: Aug. 25, 2009

(54) REINFORCED BICYCLE RIM

(75) Inventors: Tsutomu Muraoka, Osaka (JP);
Takashi Yaegashi, Osaka (JP); Shinpei Okajima, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/739,748

(22) Filed: Apr. 25, 2007

(65) Prior Publication Data
US 2008/0106141 A1 May 8, 2008

Related U.S. Application Data

(63) Continuation-in-part of application No. 11/592,325, filed on Nov. 3, 2006, now Pat. No. 7,350,877.

(51) Int. Cl.
*B60B 21/06* (2006.01)
*B60B 25/00* (2006.01)

(52) U.S. Cl. ............... 301/58; 301/95.103; 301/95.107

(58) Field of Classification Search .................. 301/55, 301/58, 64.704, 67, 70, 95.101, 95.102, 95.103, 301/95.104, 95.105, 95.106, 95.107, 95.108, 301/104; 29/894.33, 894.333
See application file for complete search history.

(56) References Cited

U.S. PATENT DOCUMENTS

| 4,483,729 A | * | 11/1984 | Fujisaki et al. .............. 156/222 |
| 4,983,430 A | | 1/1991 | Sargent |
| 4,995,675 A | | 2/1991 | Tsai |
| 5,490,719 A | | 2/1996 | Lew |
| 5,540,485 A | | 7/1996 | Enders |
| 5,549,360 A | | 8/1996 | Lipeles |
| 5,975,645 A | | 11/1999 | Sargent |
| 6,283,557 B1 | | 9/2001 | Okajima et al. |
| 6,347,839 B1 | | 2/2002 | Lew et al. |
| 6,398,313 B1 | | 6/2002 | Lew |
| 6,761,847 B2 | | 7/2004 | Meggiolan |
| 7,331,639 B2 | | 2/2008 | Okajima |
| 2004/0222689 A1 | | 11/2004 | Okajima |
| 2004/0222691 A1 | | 11/2004 | Okajima |

FOREIGN PATENT DOCUMENTS

| DE | 10 2006 048 191 A1 | 10/2007 |
| EP | 1 428 685 A2 | 6/2004 |
| EP | 1698489 | 9/2006 |
| JP | 60-080902 A | 5/1985 |
| JP | 61-125901 A | 6/1986 |
| JP | 61244602 A | * 10/1986 |
| JP | 62-128803 A | 6/1987 |
| JP | 2003-260904 A | 9/2003 |

* cited by examiner

*Primary Examiner*—S. Joseph Morano
*Assistant Examiner*—Kip T Kotter
(74) *Attorney, Agent, or Firm*—Global IP Counselors, LLP

(57) ABSTRACT

A bicycle rim is basically provided with an annular metallic rim member and a reinforcing member. The annular metallic rim member includes a plurality of spoke attachment areas with at least one spoke attachment opening in each of the spoke attachment areas. The reinforcing member overlies an exterior surface of the annular metallic rim member. The reinforcing member includes a plurality of spoke attachment sections individually arranged in a circumferential direction to overlie the spoke attachment openings. The spoke attachment sections include a plurality of discrete first reinforcing parts and a plurality of discrete second reinforcing parts. The first reinforcing parts are attached to the spoke attachment areas around the spoke attachment openings. The second reinforcing parts are attached to the spoke attachment areas to overlie the first reinforcing parts, with the second reinforcing parts being larger than the first reinforcing parts.

26 Claims, 17 Drawing Sheets

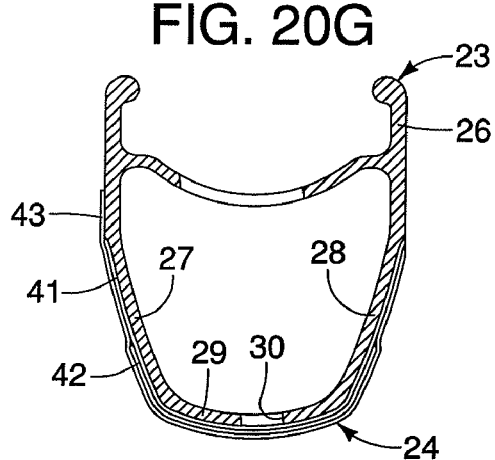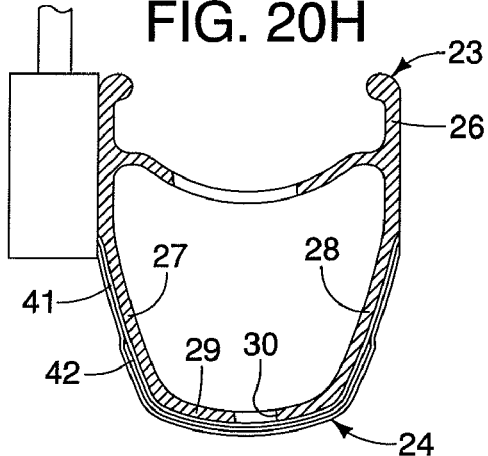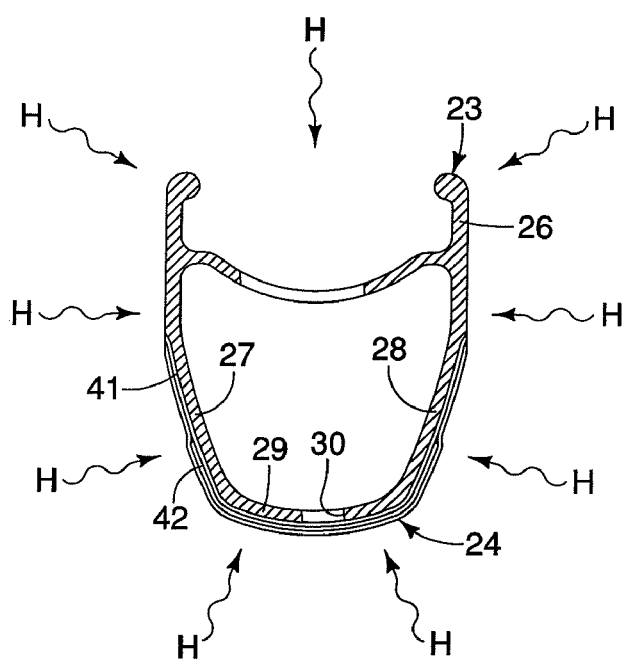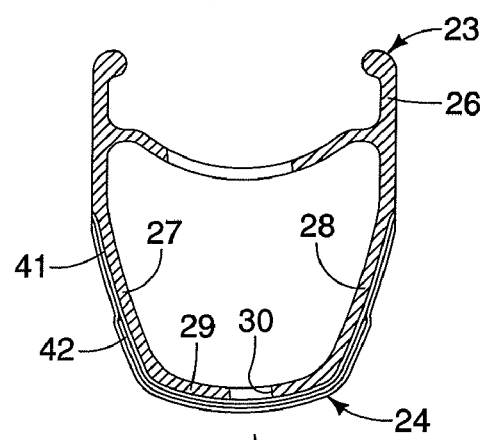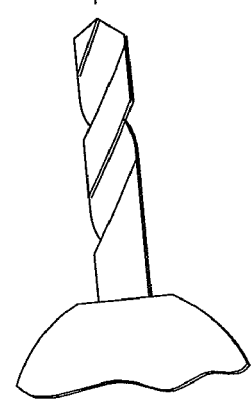

REINFORCED BICYCLE RIM

CROSS-REFERENCE TO RELATED APPLICATIONS

This application is a continuation-in-part application of U.S. patent application Ser. No. 11/592,325, filed on Nov. 3, 2006. The entire disclosure of U.S. patent application Ser. No. 11/592,325 is hereby incorporated herein by reference.

BACKGROUND OF THE INVENTION

1. Field of the Invention

This invention generally relates to a bicycle rim. More specifically, the present invention relates to a reinforced bicycle rim that has an annular metallic rim member with reinforcing resin material disposed around the spoke attachment openings.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle wheel. Bicycle wheels are constantly being redesigned to be strong, lightweight and more aerodynamic in design as well as to be simple to manufacture and assemble.

There are many different types of bicycle wheels, which are currently available on the market. Most bicycle wheels have a hub, a plurality of spokes and an annular rim. The hub is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are usually provided with flanges that are used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes within the spoke attachment holes in the rim.

Recently, bicycle wheels have been designed that have utilized spokes with higher tension between the rim and the hub to provide a more rigid wheel. When the tension in the spokes becomes very high, very strong rims are required. If the rim is made thicker over its entire circumference or a steel rim is used, then the rim may become undesirably heavy. Thus, several attempts have been made to create rims that are lightweight and can accommodate high tension spokes. One example of a bicycle rim that can accommodate high tension spokes is disclosed in U.S. Pat. No. 6,283,557, assigned to Shimano, Inc. The bicycle rim of this patent uses spokes that are attached to side surfaces of the rim by using special washers. While this rim works very well, it requires special washers that are attached to the ends of the spokes having bent ends. Several bicycle wheels have been developed that use straight spokes. These straight spokes are very strong and allow for higher tension to be used in the spokes. However, again, when the tension in the straight spokes becomes very high, then very strong rims are required. As a result, thicker and/or reinforced rims are needed when using straight spokes under high tension. Some of these reinforcements are welded or brazed to the rim, which can result in the physical properties of the rim being altered by the heat of the welding or brazing process. Thus, these thicker or reinforced rims are often heavy, difficult to manufacture and/or expensive to manufacture.

In view of the above, it will be apparent to those skilled in the art from this disclosure that there exists a need for an improved reinforced rim. This invention addresses this need in the art as well as other needs, which will become apparent to those skilled in the art from this disclosure.

SUMMARY OF THE INVENTION

One object of the present invention is to provide a rim for a bicycle wheel that is relatively strong yet relatively lightweight.

Another object of the present invention is to provide a relatively strong rim that is relatively simple and inexpensive to manufacture and assemble.

The foregoing objects can basically be attained by providing a bicycle rim that basically comprises an annular metallic rim member and a reinforcing member. The annular metallic rim member includes a plurality of spoke attachment areas with at least one spoke attachment opening in each of the spoke attachment areas. The reinforcing member overlies an exterior surface of the annular metallic rim member. The reinforcing member includes a plurality of spoke attachment sections individually arranged in a circumferential direction to overlie the spoke attachment openings. The spoke attachment sections include a plurality of discrete first reinforcing parts and a plurality of discrete second reinforcing parts. The first reinforcing parts are attached to the spoke attachment areas around the spoke attachment openings. The second reinforcing parts are attached to the spoke attachment areas to overlie the first reinforcing parts, with the second reinforcing parts being larger than the first reinforcing parts.

The foregoing objects can also basically be attained by providing a bicycle rim forming method that basically comprises forming an annular metallic rim member, applying a plurality of discrete first reinforcing parts to exteriorly overlie a plurality of spoke attachment areas of the annular metallic rim member, and applying a plurality of discrete second reinforcing parts to exteriorly overlie the first reinforcing parts, with the second reinforcing parts being larger than the first reinforcing parts.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIGS. 20A to 20J are a series of cross sectional views showing a preferred method of manufacturing the rims illustrated in FIGS. 1-3 in accordance with the first embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
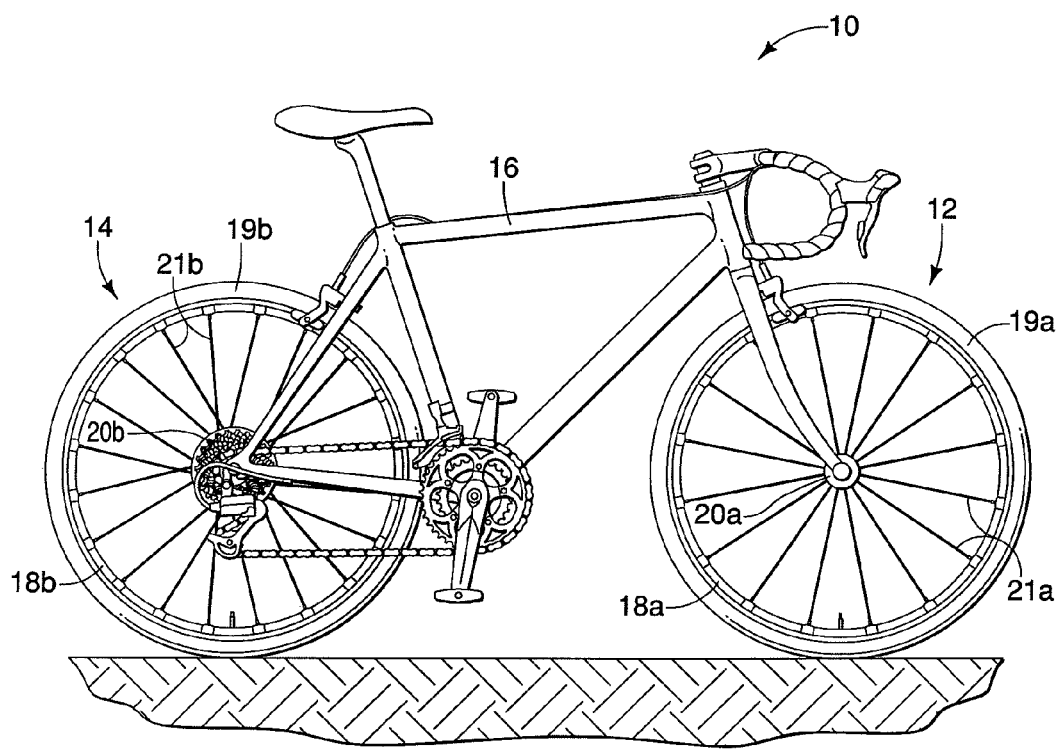
FIG. 1 is a side elevational view of a bicycle with a front bicycle wheel and a rear bicycle wheel in accordance with a first embodiment of the present invention.

Referring initially to FIG. 1, a bicycle 10 is illustrated with a front bicycle wheel 12 and a rear bicycle wheel 14 in accordance with a first embodiment of the present invention. The bicycle wheels 12 and 14 are attached to a bicycle frame 16 in a conventional manner. Since the parts of the bicycle 10 are well known in the art, the parts of the bicycle 10 will not be discussed or illustrated in detail herein, except for the parts that relate to the present invention. In other words, only the parts related to the bicycle wheels 12 and 14 will be discussed and illustrated in detail herein. Moreover, various conventional bicycle parts such as brakes, additional sprockets, derailleurs, etc., which may or may not be illustrated herein, can be used in conjunction with the present invention.

Generally, the present invention is applied in the same manner to both of the bicycle wheels 12 and 14. Also some of the parts of the bicycle wheels 12 and 14 are identical or functionally identical (have the same function but are not exactly identical). For the sake of simplicity and convenience, the identical parts and functionally identical parts of the bicycle wheels 12 and 14 will be given the same reference numerals. Referring to FIG. 1, the front bicycle wheel 12 basically includes an annular rim 18a with a pneumatic tire 19a, a center hub 20a, and a plurality of spokes 21a extending between the center hub 20a and the annular rim 18a. Similarly, the rear bicycle wheel 14 basically includes an annular rim 18b with a pneumatic tire 19b, a center hub 20b, and a plurality of spokes 21b extending between the center hub 20b and the annular rim 18b.

Figure 2:
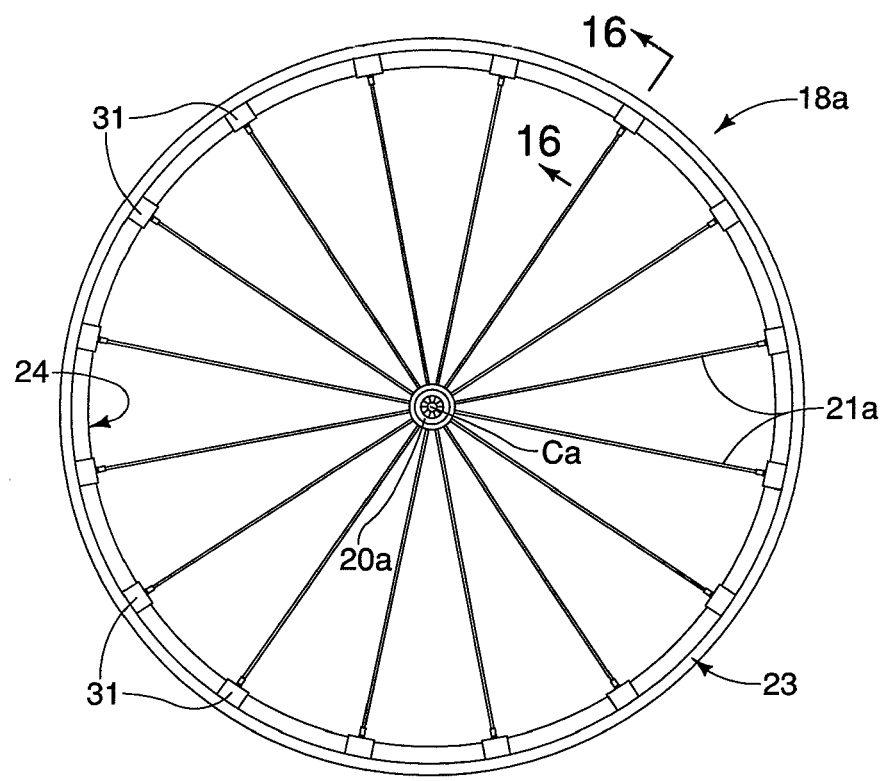
FIG. 2 is a side elevational view of the front wheel illustrated in FIG. 1 in accordance with the first embodiment of the present invention.
Figure 3:
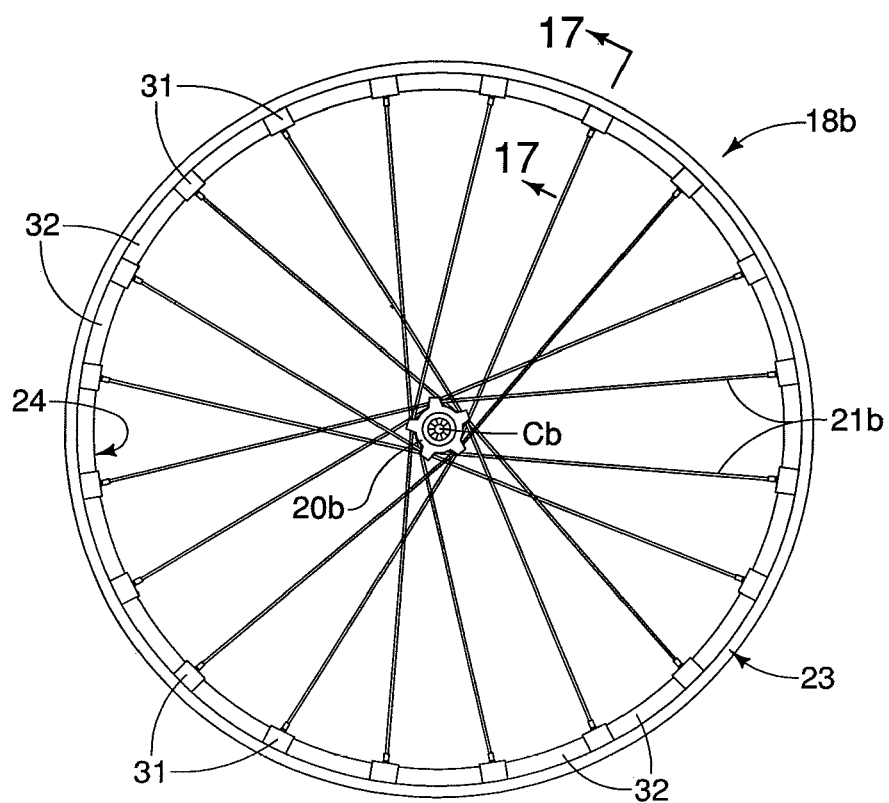
FIG. 3 is a side elevational view of the rear wheel illustrated in FIG. 1 in accordance with the first embodiment of the present invention.

Referring to FIG. 2, the rim 18a is an annular member designed for rotation about a center axis Ca of the front bicycle wheel 12. In other words, the rim 18a is substantially circular as seen in side elevation (FIG. 2). Likewise, the rim 18b is an annular member designed for rotation about a center axis Cb of the rear bicycle wheel 14. In other words, the rim 18a is substantially circular as seen in side elevation (FIG. 3). The rim 18b of the rear bicycle wheel 14 is identical to the rim 18a of the front bicycle wheel 12, except that their cross-sectional profiles are different. In particular, the rim 18a of the front bicycle wheel 12 has the cross-sectional profile illustrated in FIG. 16, while the rim 18b of the rear bicycle wheel 14 has the cross-sectional profile illustrated in FIG. 16. In view of the similar construction of the rims 18a and 18b, only the rim 18a of the front bicycle wheel 12 will be discussed and illustrated in detail herein. It will be apparent to those skilled in the art form this disclosure that the construction of the rim 18a as discussed and illustrated herein applies to the construction of the rim 18b.

The rim 18a basically includes an annular metallic rim member 23 with a reinforcing resin member 24 applied to the annular metallic rim member 23. The reinforcing resin member 24 is formed of a plurality of layers of fiber reinforced resin/plastic sheets to form a reinforced spoke attachment areas as discussed below.

Figure 4:
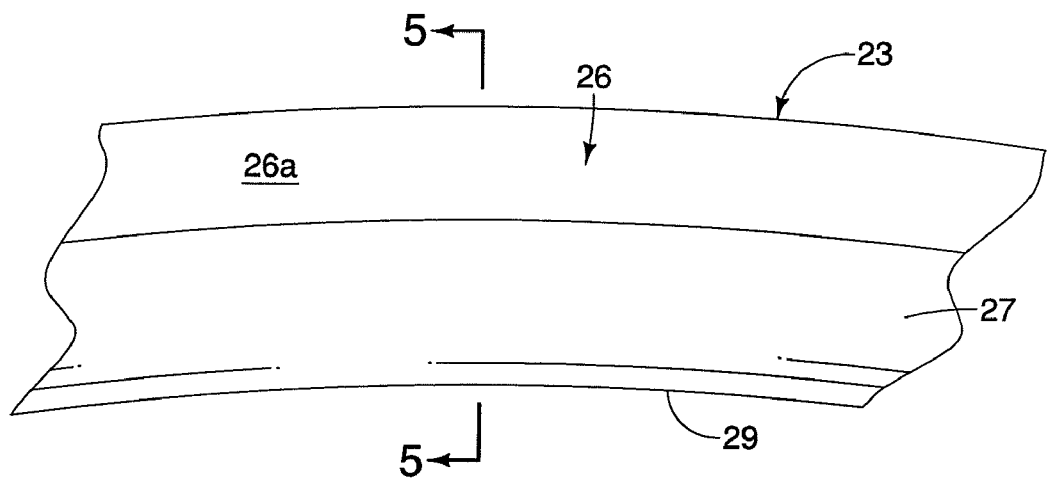
FIG. 4 is a partial side elevational view of the metallic rim member of front rim for the front wheel illustrated in FIGS. 1 and 2, prior to application of the reinforcing member.
Figure 5:
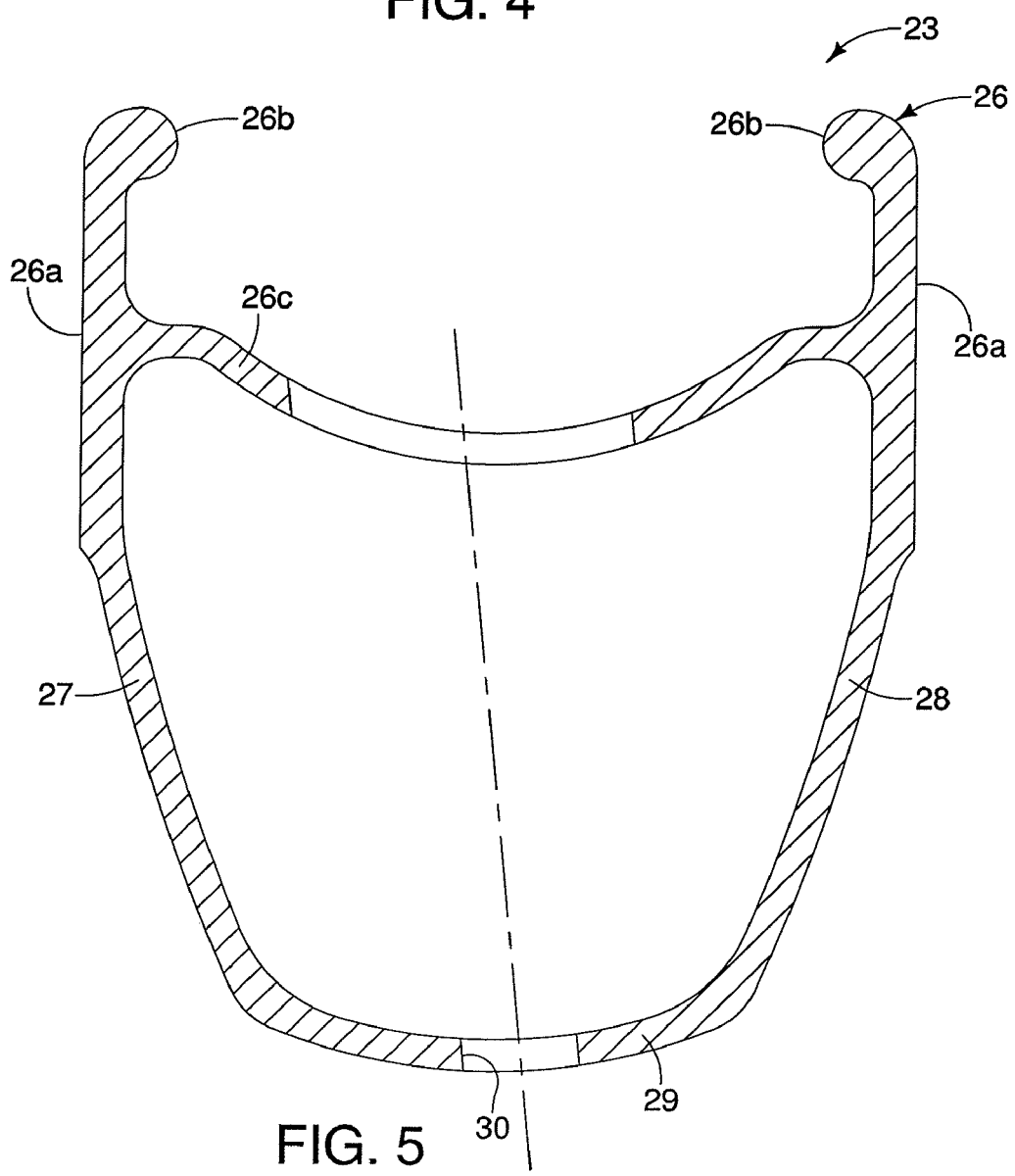
FIG. 5 is an enlarged cross sectional view of the metallic rim member of front rim for the front wheel illustrated in FIG. 4, as seen along section line 5-5 of FIG. 4.
Figure 6:
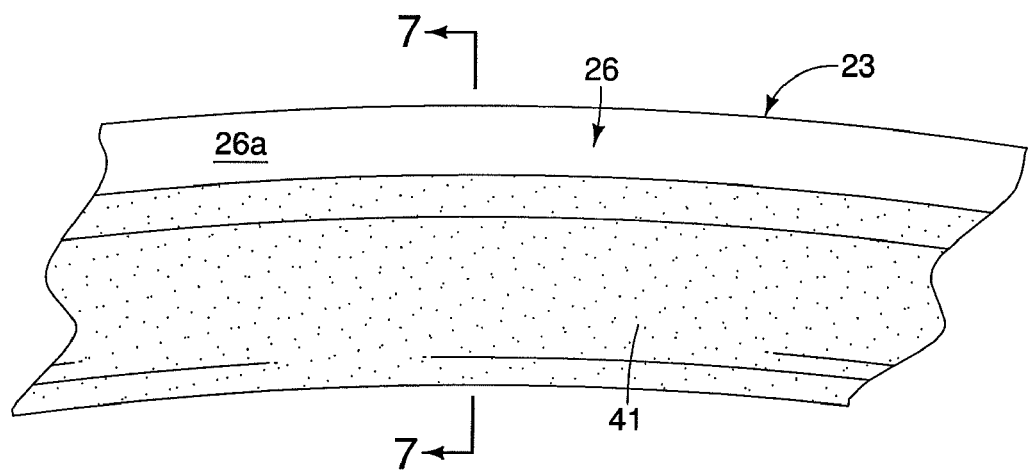
FIG. 6 is a partial side elevational view of the metallic rim member of front rim for the front wheel illustrated in FIGS. 1 and 2, with the continuous circumferential part of the reinforcing member applied thereto, but prior to application of the individual segment parts of the reinforcing member.
Figure 7:
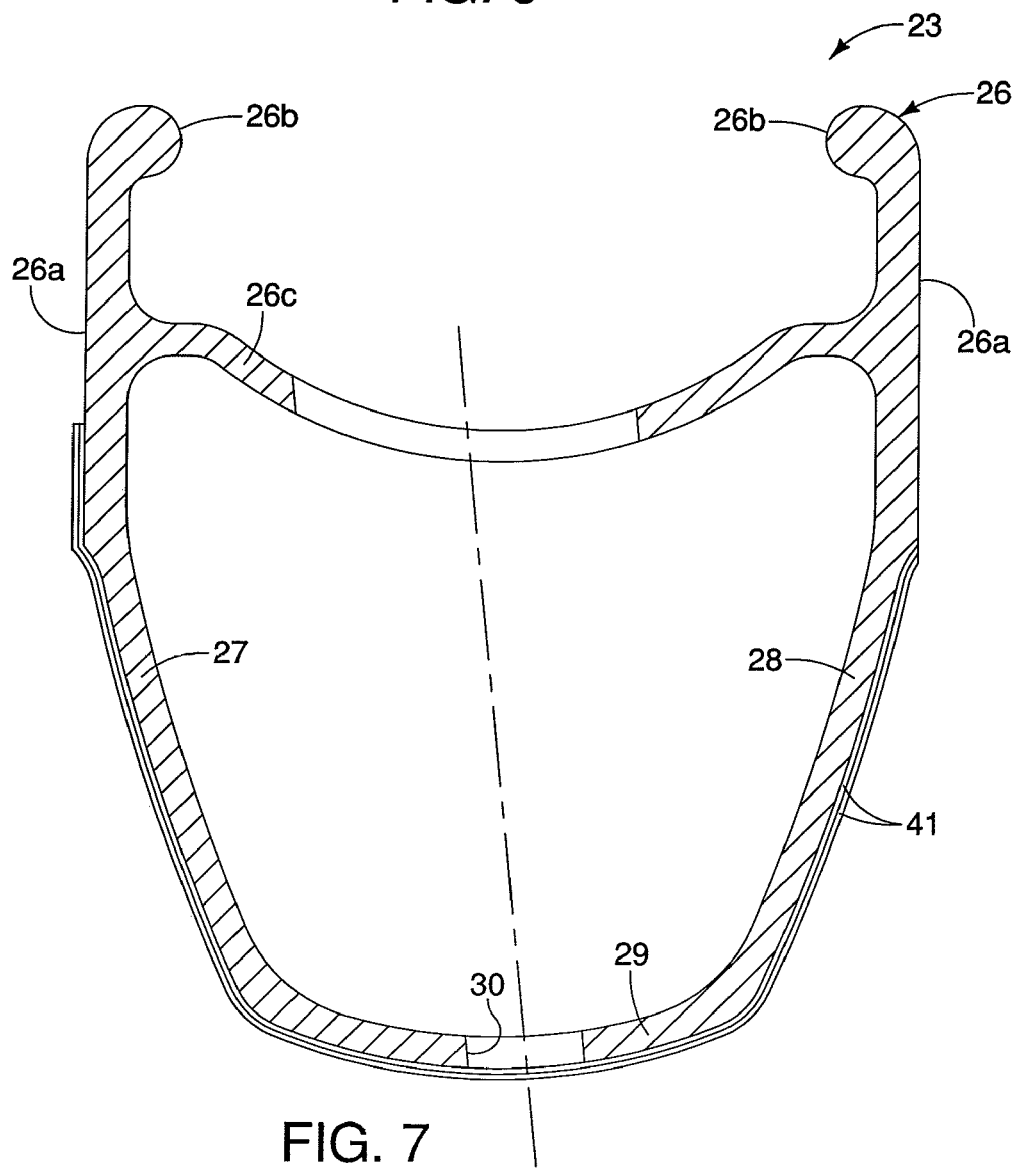
FIG. 7 is an enlarged cross sectional view of the metallic rim member with the continuous circumferential part of the reinforcing member applied thereto illustrated in FIG. 6, as seen along section line 7-7 of FIG. 6.
Figure 8:
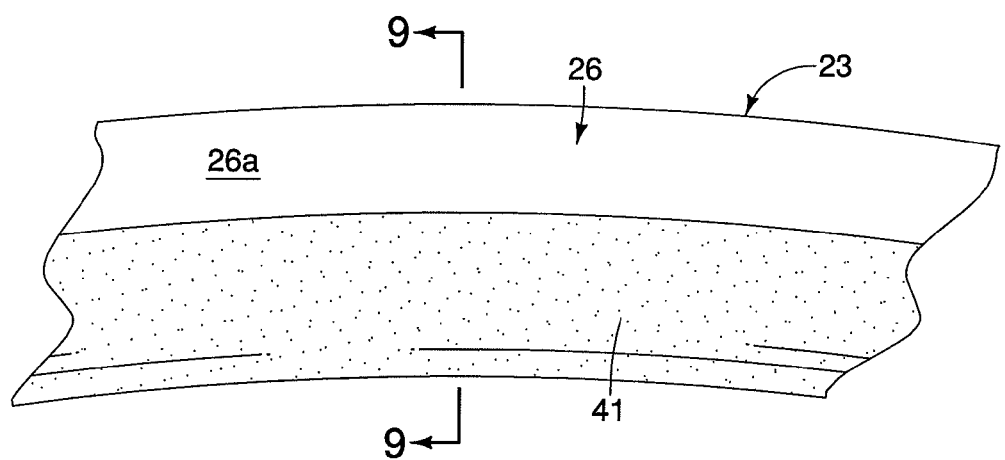
FIG. 8 is a partial side elevational view of the metallic rim member of front rim for the front wheel illustrated in FIGS. 1 and 2, with the continuous circumferential part of the reinforcing member applied thereto, after the excess material of the continuous circumferential part has been trimmed away, but prior to application of the individual segment parts of the reinforcing member.
Figure 9:
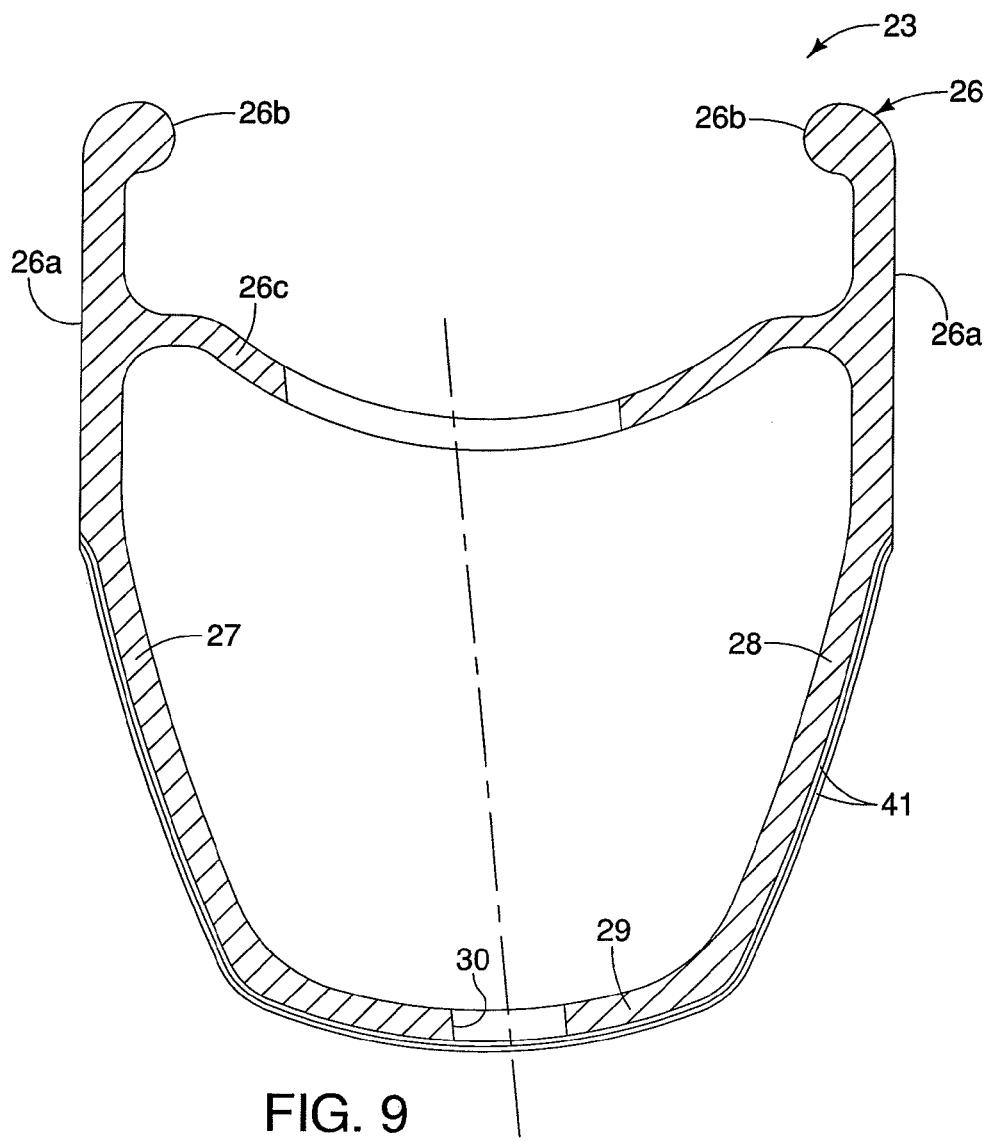
FIG. 9 is an enlarged cross sectional view of the metallic rim member with the continuous circumferential part of the reinforcing member applied thereto illustrated in FIG. 8, as seen along section line 9-9 of FIG. 8.
Figure 10:
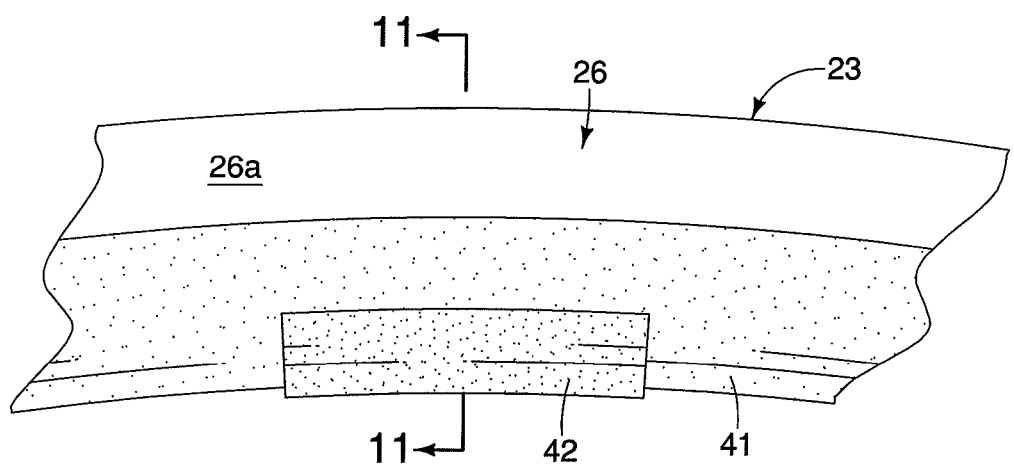
FIG. 10 is a partial side elevational view of the metallic rim member of front rim for the front wheel illustrated in FIGS. 1 and 2, with the continuous circumferential part of the reinforcing member and the inner segment parts of the reinforcing member applied thereto, but prior to application of the outer segment parts of the reinforcing member.
Figure 11:
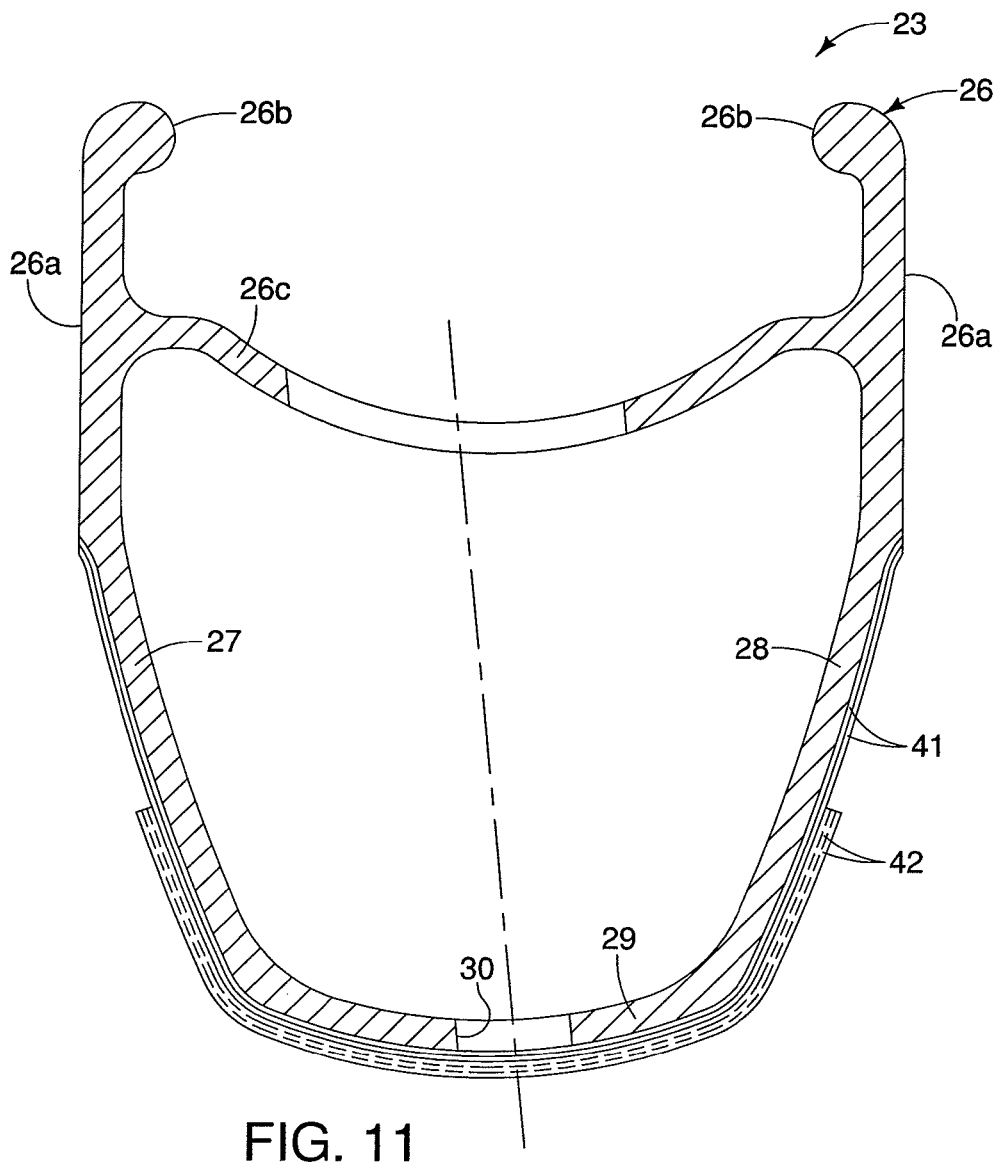
FIG. 11 is an enlarged cross sectional view of the metallic rim member with the continuous circumferential part of the reinforcing member and the inner segment parts of the reinforcing member applied thereto illustrated in FIG. 10, as seen along section line 11-11 of FIG. 10.
Figure 12:
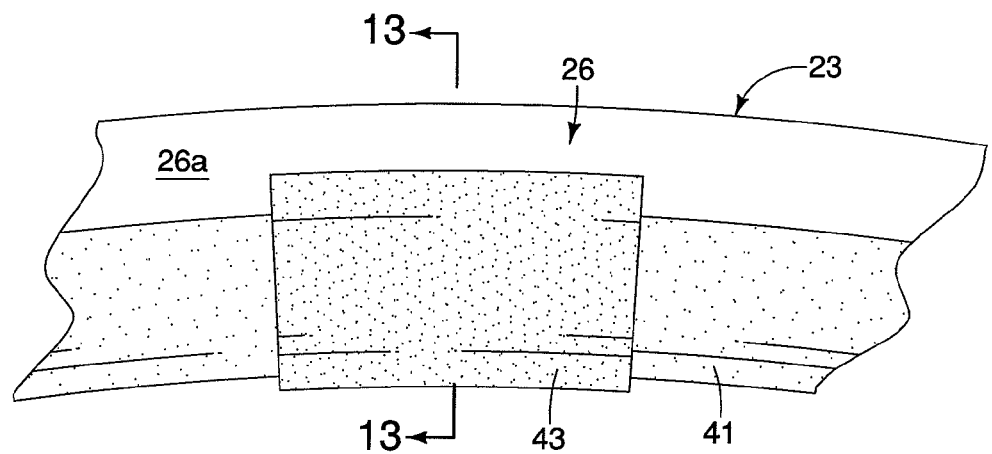
FIG. 12 is a partial side elevational view of the front rim for the front wheel illustrated in FIGS. 1 and 2, with the continuous circumferential part of the reinforcing member, the inner segment parts and the outer segment parts of the reinforcing member applied thereto, but prior to removal of the excess material of the outer segment parts of the reinforcing member.
Figure 13:
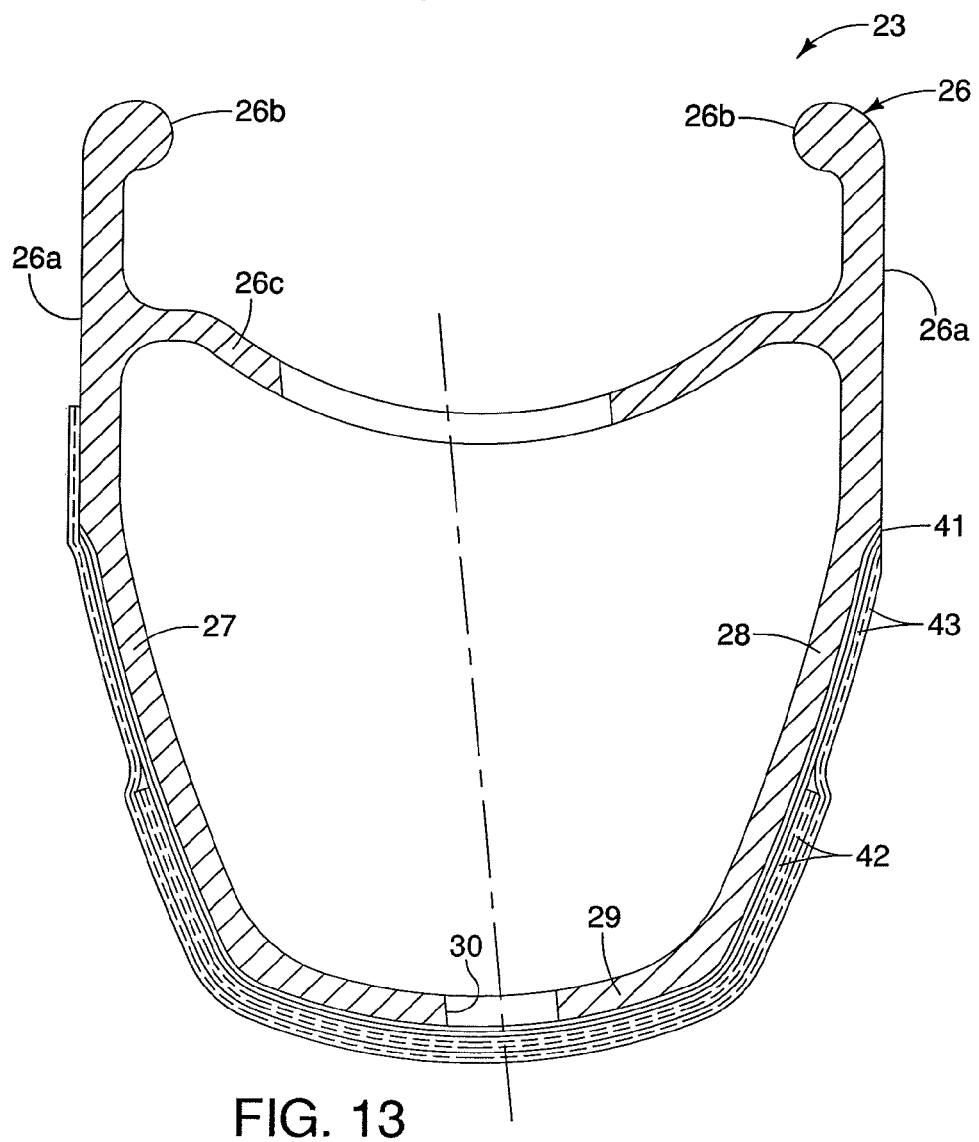
FIG. 13 is an enlarged cross sectional view of the front rim for the front wheel illustrated in FIG. 12, as seen along section line 13-13 of FIG. 12.
Figure 14:
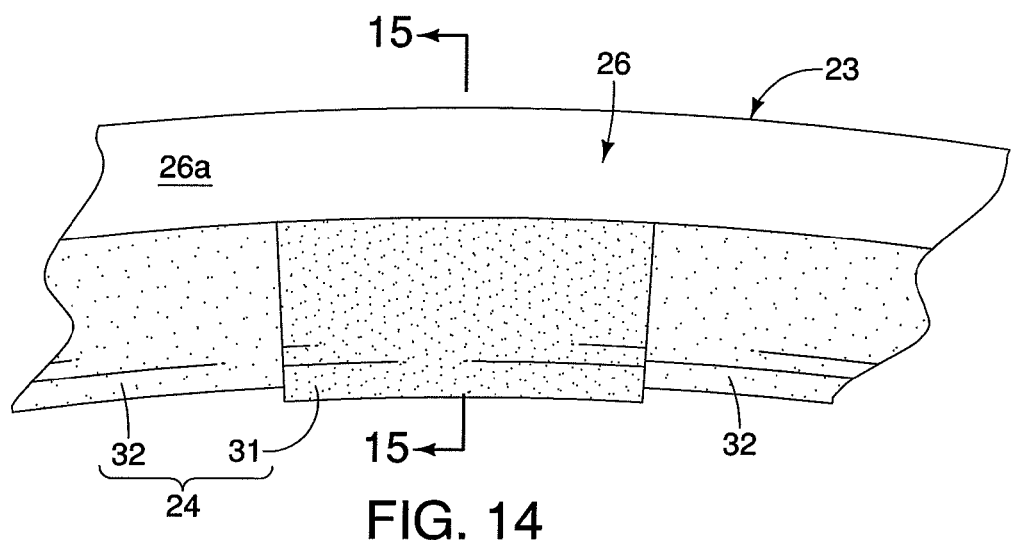
FIG. 14 is a partial side elevational view of the front rim for the front wheel illustrated in FIGS. 1 and 2, with the continuous circumferential part of the reinforcing member, the inner segment parts and the outer segment parts of the reinforcing member applied thereto, after the excess material of the outer segment parts of the reinforcing member has been trimmed away.
Figure 15:
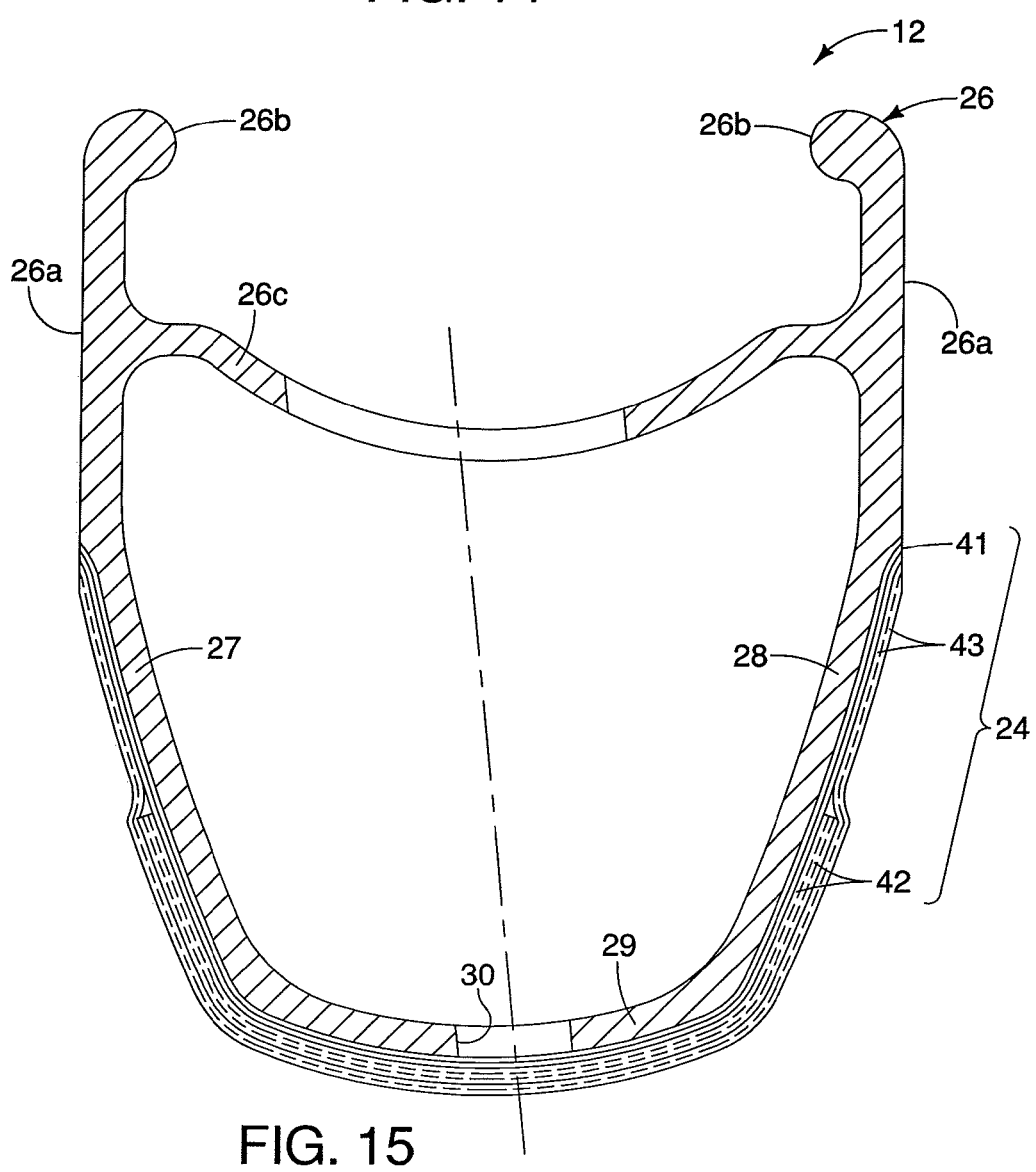
FIG. 15 is an enlarged cross sectional view of the front rim for the front wheel illustrated in FIG. 14, as seen along section line 15-15 of FIG. 14.

As seen in FIGS. 4 and 5, the annular metallic rim member 23 is constructed of a substantially rigid material, such as those materials, which are well known in the art. For example, the annular metallic rim member 23 can be constructed of any suitable metallic material, such as plated steel, stainless steel, aluminum, magnesium or titanium. The annular metallic rim member 23 basically includes an annular tire attachment portion 26 adapted to have the tire 19a mounted thereon, a first annular side wall portion 27, a second annular side wall portion 28 and an inner annular wall portion 29 connecting the first and second annular side wall portions 27 and 28 with a plurality of spoke attachment openings 30 formed in the inner annular wall portion 29. While only one of the spoke attachment openings 30 is illustrated in each of the spoke attachment areas with the reinforcing resin member 24, it will be apparent to those skilled in the art from this disclosure that each of the spoke attachment areas can have more than one spoke attachment opening as needed and/or desired.

Basically, the annular metallic rim member 23 has a uniform cross-sectional profile about its entire circumference, except that material as been removed to form spoke access holes in the annular tire attachment portion 26 that are aligned with the spoke attachment openings 30, material has been removed to form a valve attachment hole in both the annular tire attachment portion 26 and the inner annular wall portion 29 to receive an air filling valve (not shown), and material as been removed from the inner annular wall portion to form the spoke attachment openings 30. In the illustrated embodiment, the wall portions 27, 28 and 29 are preferably constructed to be thinner than similar portions of non-reinforced metallic rims.

Figure 16:
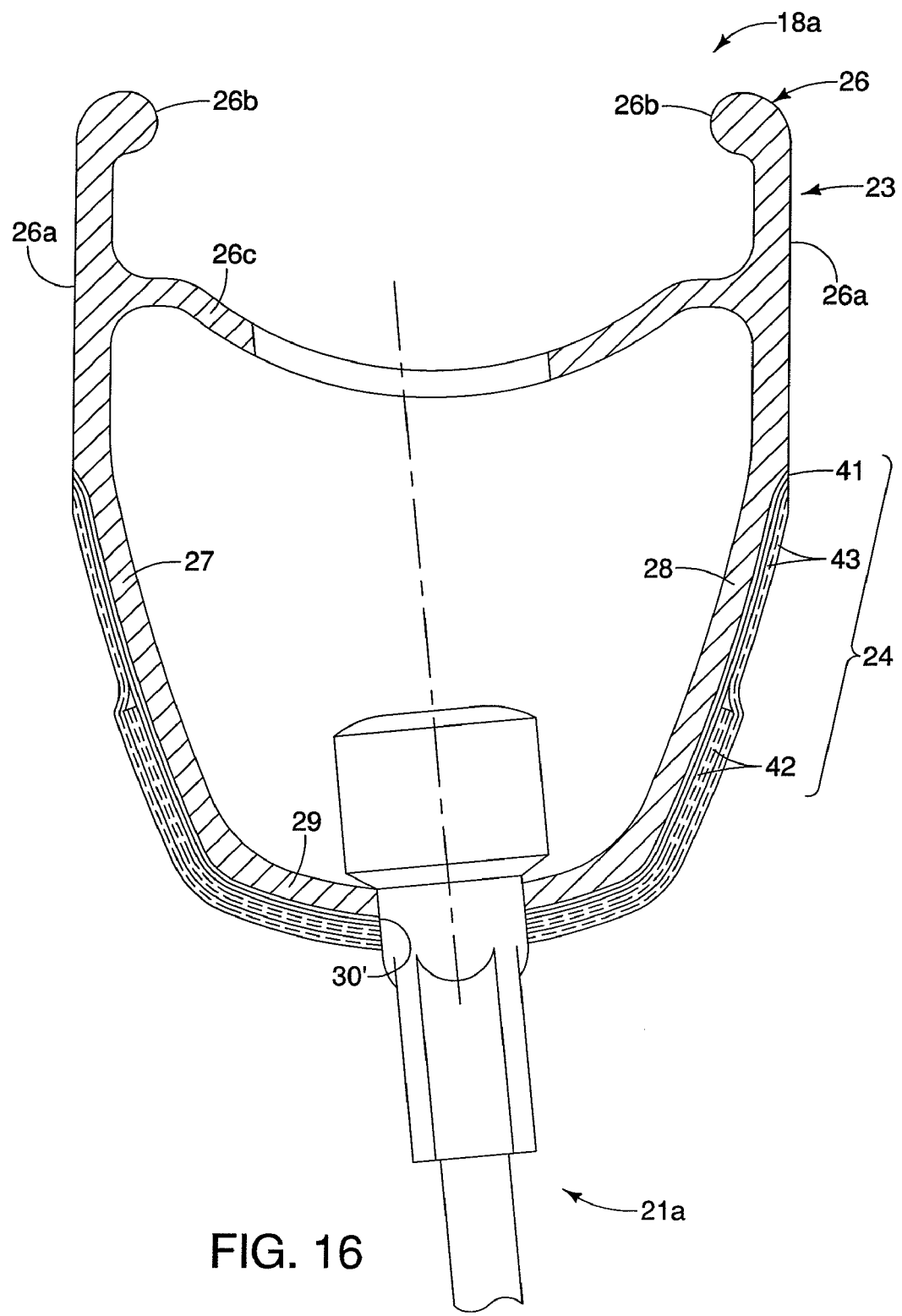
FIG. 16 is an enlarged cross sectional view of the front rim for the front wheel as seen along section line 16-16 of FIG. 2, showing one of the spokes attached to the front rim.

FIG. 5 illustrates the annular metallic rim member 23 before the reinforcing resin member 24 has been applied to the wall portions 27, 28 and 29 of the annular metallic rim member 23 (seen in FIGS. 6-15), and prior to widening the diameter of the spoke attachment openings 30 (seen in FIG. 16). The annular tire attachment portion 26 is an outer annular portion of the annular metallic rim member 23 that is configured and arranged to have the tire 19a mounted thereon in a conventional manner. The annular tire attachment portion 26 forms a substantially U-shaped tire receiving recess as seen in cross-section in FIG. 5. The tire attachment portion 26 also forms a pair of annular braking surfaces 26a. The tire attachment portion 26 has a pair of annular ribs 26b formed at its free ends to retain beads of the tire 19a in a conventional manner. The annular braking surfaces 26a face outwardly away from the center plane to engage conventional rim brakes. An annular connecting section 26c extends between the wall portions 27 and 28.

The wall portions 27, 28 and 29 is generally U-shaped in cross section with upper ends of the annular side wall portions 27 and 28 coupled to the annular connecting section 26c of the annular tire attachment portion 26 to form a hollow interior. Thus, the annular metallic rim member 23 is a tubular member. The spoke attachment openings 30 are evenly spaced about an innermost part of the circumference of the inner annular wall portion 29 for receiving the spokes 21a therein as best understood from FIG. 1. In the illustrated embodiment, the inner annular wall portion 29 has sixteen of the spoke attachment openings 30 in order to attach a total of sixteen of the spokes 21a thereto. Alternating ones of the spoke attachment openings 30 can be preferably slightly angled in opposite axial directions relative to a rim center plane so that the spokes 21a coupled thereto extend to opposite ends of the hub 20a.

The reinforcing resin member 24 is attached to the annular metallic rim member 23 such that the reinforcing resin material continuously extends from the first annular side wall portion 27 across the inner annular wall portion 29 to the second annular side wall portion 28 to overlie exterior surface areas of the first and second annular side wall portions 27 and 28 and exterior surface areas of the inner annular wall portion 29 around the spoke attachment openings 30. The reinforcing resin member 24 effectively increases the thickness of the annular metallic rim member 23 about the entire circumference of the rim 18a to provide rigid reinforcement to the rim 18a.

When the reinforcing resin member 24 is applied to the annular metallic rim member 23, the thickness of the inner annular wall portion 29 at the spoke attachment openings 30 is increased by a first amount to form a plurality of thick spoke attachment sections 31 and a second smaller amount in intermediate areas to form thinner intermediate sections 32 disposed between adjacent pairs of the spoke attachment sections 31. Thus, the reinforcing member 24 varies in thickness about the inner portion of the annular metallic rim member 23 so as to include a plurality of the thick spoke attachment sections 31 overlying the spoke attachment areas, respectively, and a plurality of the thinner intermediate sections 32 disposed between adjacent pairs of the thick spoke attachment sections 31 in an alternating manner. In other words, the spoke attachment sections 31 of the reinforcing resin member 24 are thicker than the intermediate sections 32 of the reinforcing resin member 24.

In particular, as seen in the illustrated embodiment of FIGS. 7-16, the reinforcing resin member 24 basically includes a plurality of first resin sheets 41, a plurality of second resin sheets 42 and a plurality of third resin sheets 43. The first resin sheets 41 extend continuously about the entire circumference of the annular metallic rim member 23. Preferably, the first resin sheets 41 extend between the braking surfaces 26a such that the braking surfaces 26a are exposed (i.e., not covered by the first resin sheets 41). In other words, the first resin sheets 41 completely cover the exterior surface areas of the annular side wall portion 27 and 28 below the braking surfaces 26a and the exterior surface areas of the inner annular wall portion 29. The first resin sheets 41 are formed of a plurality of individually discrete sheets that are secured to the exterior surface areas of the annular side wall portion 27 and 28 below the braking surfaces 26a and the exterior surface areas of the inner annular wall portion 29.

The second resin sheets 42 are formed of a plurality of individually discrete sheets that are secured to the annular metallic rim member 23 at each of the spoke attachment openings 30 to overlie portions of the exterior surface areas of the annular side wall portion 27 and 28 and the exterior surface areas of the inner annular wall portion 29 at each of the spoke attachment openings 30. Specifically, the second resin sheets 42 are preferably rectangular sheets that measure 25 mm in the circumferential direction by 12 mm in the radial/axial direction, which are secured to the first resin sheets 41. Preferably the second resin sheets 42 are secured to the first resin sheets 41 after the first resin sheets 41 have been secured to the annular metallic rim member 23.

The third resin sheets 43 are similar to the second resin sheets 42, but are larger. The third resin sheets 43 are formed of a plurality of individually discrete sheets that are secured to the annular metallic rim member 23 at each of the spoke attachment openings 30 to overlie portions of the exterior surface areas of the annular side wall portion 27 and 28 and the exterior surface areas of the inner annular wall portion 29 at each of the spoke attachment openings 30. Specifically, the third resin sheets 43 are preferably rectangular sheets that measure 25 mm in the circumferential direction by 41 mm in the radial/axial direction, which are secured to the first and second resin sheets 41 and 42. Thus, the third resin sheets 43 are preferably larger than the second resin sheets 42. More specifically, the third resin sheets 43 are secured to the first resin sheets 41 in the areas where the third resin sheets 43 extend beyond the second resin sheets. Preferably the third resin sheets 43 are secured to the first and second resin sheets 41 and 42 after the first and second resin sheets 41 and 42 have been secured together and secured to the annular metallic rim member 23.

The first, second and third resin sheets 41, 42 and 43 form the spoke attachment sections 31 of the reinforcing member 24, while the first resin sheets 41 form the intermediate sections 32 of the reinforcing member 24. Accordingly, the reinforcing member 24 includes a reinforcing resin material that extends continuously in a circumferential direction about an entire circumferential area of the annular metallic rim member 23 with the thick sections spoke attachment sections 31 surrounding the areas about the spoke attachment openings 30.

In one example of the present invention, the reinforcing resin member 24 includes two of the first resin sheets 41 constituting a continuous circumferential part of the reinforcing member 24 having at least two individual reinforcing layers bonded together, sixteen of the second resin sheets 42 and six of the third resin sheets 43 constituting the spoke attachment sections 31 having a plurality of individual reinforcing layers bonded together over the continuous circumferential part at circumferentially spaced apart locations. In other words, the second resin sheets 42 and the third resin sheets 43 are a plurality of individual or discrete sections that are circumferentially spaced apart about the annular metallic rim member 23 that corresponds to the spoke attachment openings 30. Each of the individual sheets 42 and 43 of the reinforcing resin member 24 is preferably identical in construction, except for their sizes as mentioned above. Of course, the individual sections of the reinforcing resin member 24 can be slightly different if needed and/or desired for a particular application.

Figure 18:
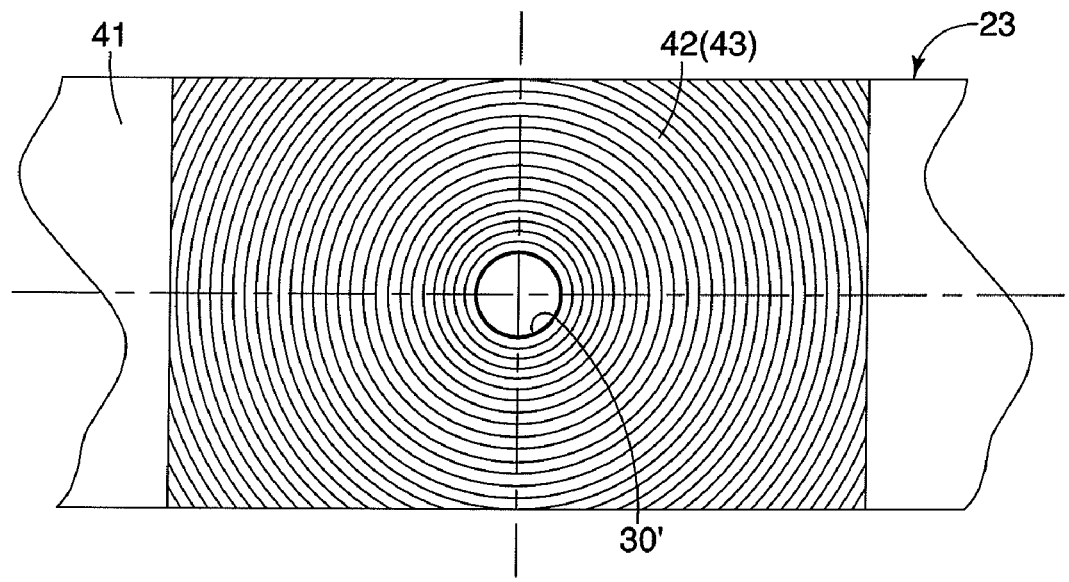
FIG. 18 is an enlarged inside view an inner portion of the front or rear rim which shows one type of reinforcing resin material that includes epoxy with one or more carbon impregnated layers having ring shaped carbon fibers that are annularly arranged around a corresponding one of the spoke attachment openings.

Preferably, the resin sheets 41, 42 and 43 are fiber reinforced resin/plastic sheets that include epoxy with one or more carbon fiber impregnated layers. The fiber impregnated resin sheets 41, 42 and 43 are melted together to form a plurality of integrated one-piece reinforcements. In the illustrated embodiment, the sheets 42 and 43 of the reinforcing resin member 24 preferably includes at least some of the carbon impregnated layers of the spoke attachment sections 31 with ring shaped fibers (FIG. 18) that are annularly arranged around a corresponding one of the spoke attachment openings 30.

Figure 19:
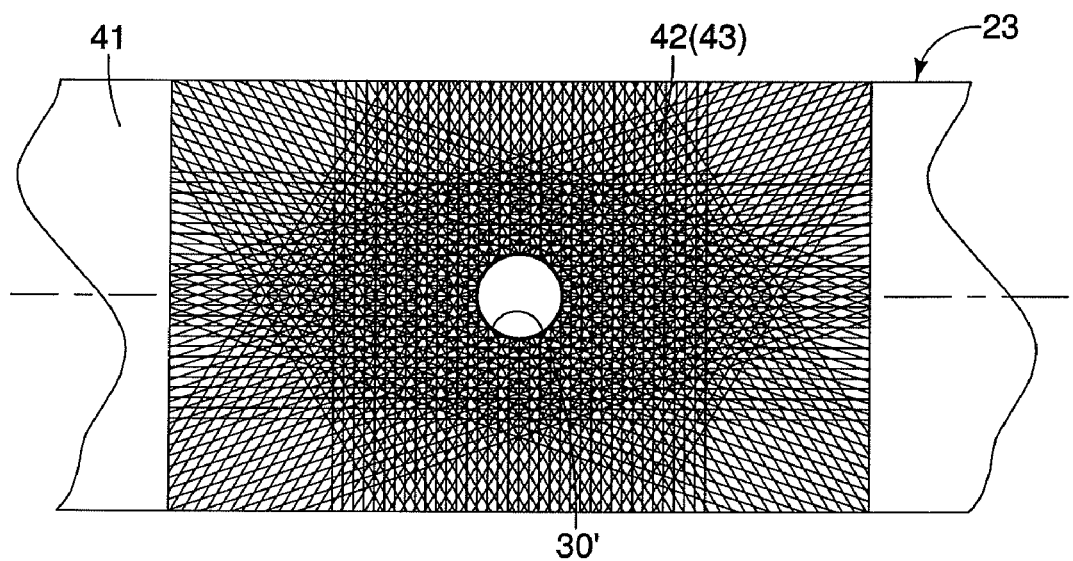
FIG. 19 is an enlarged inside view an inner portion of the front or rear rim which shows one type of reinforcing resin material that includes epoxy with one or more carbon impregnated layers having carbon fibers that extend at least in one of a radial direction relative to a corresponding one of the spoke attachment openings and a tangential direction relative to the corresponding one of the spoke attachment openings.

Alternatively, the sheets 42 and 43 of the reinforcing resin member 24 include at least some of the carbon impregnated layers of the spoke attachment sections 31 with fibers (FIG. 19) that either extend in the radial direction relative to a corresponding one of the spoke attachment openings 30 and/or the tangential direction relative to the corresponding one of the spoke attachment openings 30. Preferably, each of the spoke attachment sections 31 of the reinforcing member 24 has an overall maximum thickness in a range of about 1 millimeter to about 2 millimeters. Of course, it will be apparent to those skilled in the bicycle art from this disclosure that the fiber patterns illustrated in FIGS. 18 and 19 may, in reality, look slightly different (e.g. distorted at the edges of the annular metallic rim member 23) due to the curvature of the annular metallic rim member 23.

In the illustrated embodiment, the first, second and third resin sheets 41, 42 and 43 of the reinforcing resin member 24 are all preferably formed as fiber reinforced sheets embedded with resin/plastic. Thus, the rim 18a is a composite rim made of both metallic and non-metallic materials. The reinforcing resin member 24 is directly bonded to the annular metallic rim member 23. While heat is used to apply the first, second and third resin sheets 41, 42 and 43, the heat is lower than a temperature that would physical alter the metallic material of the annular metallic rim member 23.

The resin sheets 41, 42 and 43 in this embodiment are preferably thin sheets of continuous reinforcement fibers impregnated with a thermoset resin or a thermoplastic resin, which are often called prepreg sheets. The resin sheets 41, 42 and 43 (prepreg sheets) are soft material at room temperature. However, when the resin sheets 41, 42 and 43 (prepreg sheets) are heated, the resin once becomes low viscosity. However, after that the resin of the resin sheets 41, 42 and 43 becomes very hard, e.g., solid at 130° C.-150° C.

In one preferred embodiment, the resin sheets 41, 42 and 43 (prepreg sheets) include carbon fibers or a glass fiber impregnated with an epoxy resin. In other preferred embodiments, the resin sheets 41, 42 and 43 (prepreg sheets) can include virtually any reinforcement fiber, with virtually any matrix resin that can carry out the present invention. The thickness and surface finish of the resin sheets 41, 42 and 43 (prepreg sheets) can be varied to suit the desired requirements of the wheel. In this embodiment, two of the resin sheets 41, are illustrated as being used to cover an entire circumferential section of the inner annular wall portion 29. However, the number of the resin sheets 41 will depend on a number of factors. Likewise, the number of the resin sheets 42 and 43 will depend on a number of factors. Thus, number of the resin sheets 41, 42 and 43 are shown just for purposes of illustration of one suitable arrangement (i.e., the actual number of sheets can be more or less than shown depending on a number of factors).

The spokes 21a are tension spokes that interconnect the hub 20a and the rim 18a together as explained below. In the illustrated embodiment, the front bicycle wheel 12 includes sixteen of the spokes 21a that extend generally radially from the hub 20a to the rim 18a. Also, in the illustrated embodiment, the spokes 21a are coupled to the rim 18a at equally spaced circumferential locations as seen in FIG. 1. Of course, it will be apparent to those skilled in the art from this disclosure that the front bicycle wheel 12 could use a modified rim and/or hub in order to accommodate different spoking arrangements without departing from the scope of the present invention. Moreover, it will be apparent to those skilled in the art from this disclosure that the front bicycle wheel 12 could use a modified rim and/or hub in order to accommodate fewer or more spokes 21a if needed and/or desired. In any case, the spokes 21a are preferably coupled to the annular rim 18a in circumferentially spaced arrangement.

Referring now to FIGS. 2 and 3, the spokes 21a are preferably straight spokes that are identical to each other. Each of the spokes 21a basically includes a threaded outer end portion, a straight center or a middle portion and an inner headed end portion. The threaded outer end portions of the spokes 21a are coupled to the hub 20a by conventional spoke nipples. The spokes 21a are preferably wire-type spokes that are relatively conventional.

Referring now to FIGS. 20A to 20J, a preferred method of manufacturing rim 18a will now be explained in more detail. First, the annular metallic rim member 23 is formed utilizing conventional rim manufacturing techniques. For example, the annular metallic rim member 23 can be constructed by extruding a length of aluminum with the cross-sectional shape that includes the annular tire attachment portion 26, the side annular wall portions 27 and 28 and the inner annular wall portion 29. Next, the side annular wall portions 27 and 28 and the inner annular wall portion 29 are thinned so as to reduce the overall weight of the annular metallic rim member 23. Then, the aluminum extruded rim member is cut to the appropriate length and bent into a circular shape. The ends of the aluminum extruded rim member are then welded together. The various holes including spoke attachment openings 30 can be punched or drilled before or after the ends of the aluminum extruded rim member are welded together.

Figure 20A:
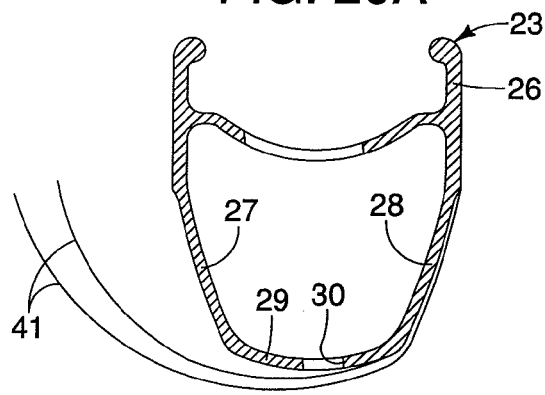
Figure 20B:
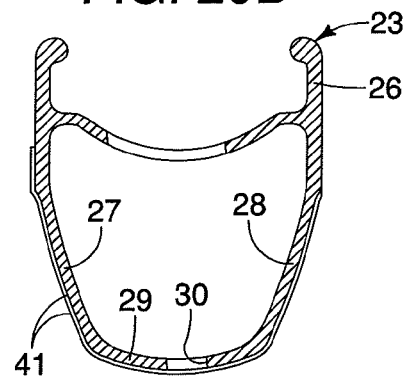
Figure 20C:
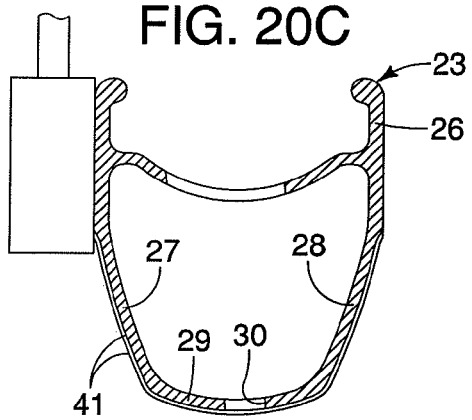
Figure 20D:
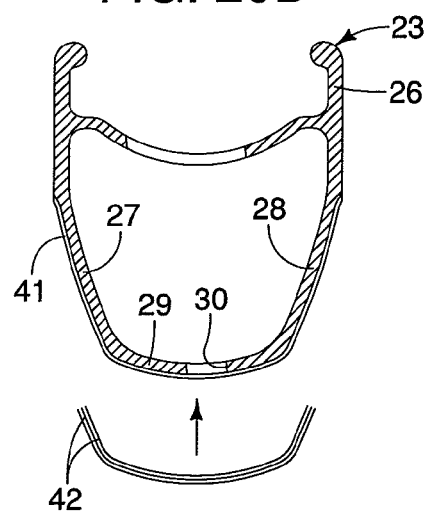
Figure 20E:
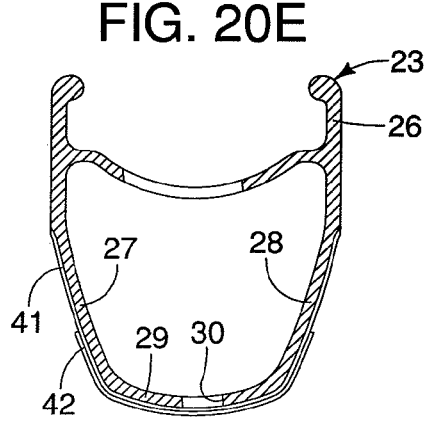
Figure 20F:
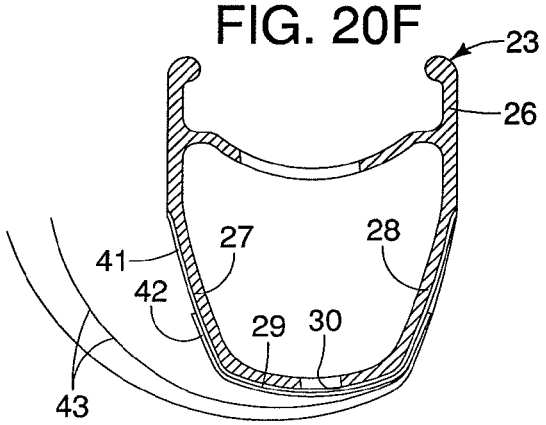

Once the annular metallic rim member 23 is formed with the cross-sectional shape illustrated in FIGS. 3 and 5, the reinforcing resin member 24 is applied to the annular metallic rim member 23 in several stages, as illustrated in FIGS. 20A-20H. Preferably, the first sheets 41 are first applied continuously in a circumferential direction about an entire circumferential area of the annular metallic rim member 23, as illustrated in FIGS. 20A and 20B. Then the first sheets 41 are preferably trimmed using a conventional cutting/grinding tool (only diagrammatically illustrated) to remove excess material, as shown in FIG. 20C. Preferably, the second sheets 42 (only two/three sheets shown for the purpose of illustration) are then applied at a plurality of discrete locations where the spoke attachment openings 30 are located, as shown in FIGS. 20D and 20E. Then, the third sheets 43 are preferably applied at plurality of discrete locations where the spoke attachment openings 30 are located, as shown in FIGS. 20F and 20G. The third sheets 43 are then preferably trimmed using the conventional cutting/grinding tool (only diagrammatically illustrated) to remove excess material, as shown in FIG. 20H.

In this embodiment, twenty-four resin sheets 41, 42 and 43 (e.g. two first sheets 41, sixteen second sheets 42 and six third sheets 43) overlie the areas surrounding the spoke attachment openings 30, while only two resin sheets 41 overlie the intermediate areas. However, the exact number of sheets 41, 42 and 43 are not always illustrated herein to avoid confusion (due to the minimal thickness of the sheets).

The application of the resin sheets 41, 42 and 43 is preferably accomplished by applying a heat shrink wrap material (not shown) over the resin sheets 41, 42 and 43. Preferably, the heat shrink wrap material is a tape that is spirally wound around the entire circumference of the annular metallic rim member 23 with a slight overlap between adjacent coils. Then heat H is applied to the heat shrink wrap material such that the heat shrink wrap material firmly presses the resin sheets 41, 42 and 43 against and the wall portions 27, 28 and 29. This application of the heat H to the heat shrink wrap material also causes the resin of the resin sheets 41, 42 and 43 to melt and thus adhere to the metallic rim member 23 or the prior resin sheet.

Preferably, the heat H is applied such that the annular metallic rim member 23 with the reinforcing resin member 24 is heated to between about 130° C. to about 150° C., preferably about 130° C., for about 3 hours. The heating temperature is selected based on the material(s) of the reinforcing resin member 24 (e.g., the sheets 41, 42 and 43) and the annular metallic rim member 23. Specifically, the heating temperature is selected such that the reinforcing resin member 24 will melt/adhere to the annular metallic rim member 23, but also such that the physical properties of the annular metallic rim member 23 will not be altered by the heat H (temperature) needed to melt/adhere the reinforcing resin member 24 thereto. Of course, it will be apparent to those skilled in the art from this disclosure that the heating temperature and/or heating time may vary depending the exact materials used for the reinforcing resin member 24 and the annular metallic rim member 23.

Figure 17:
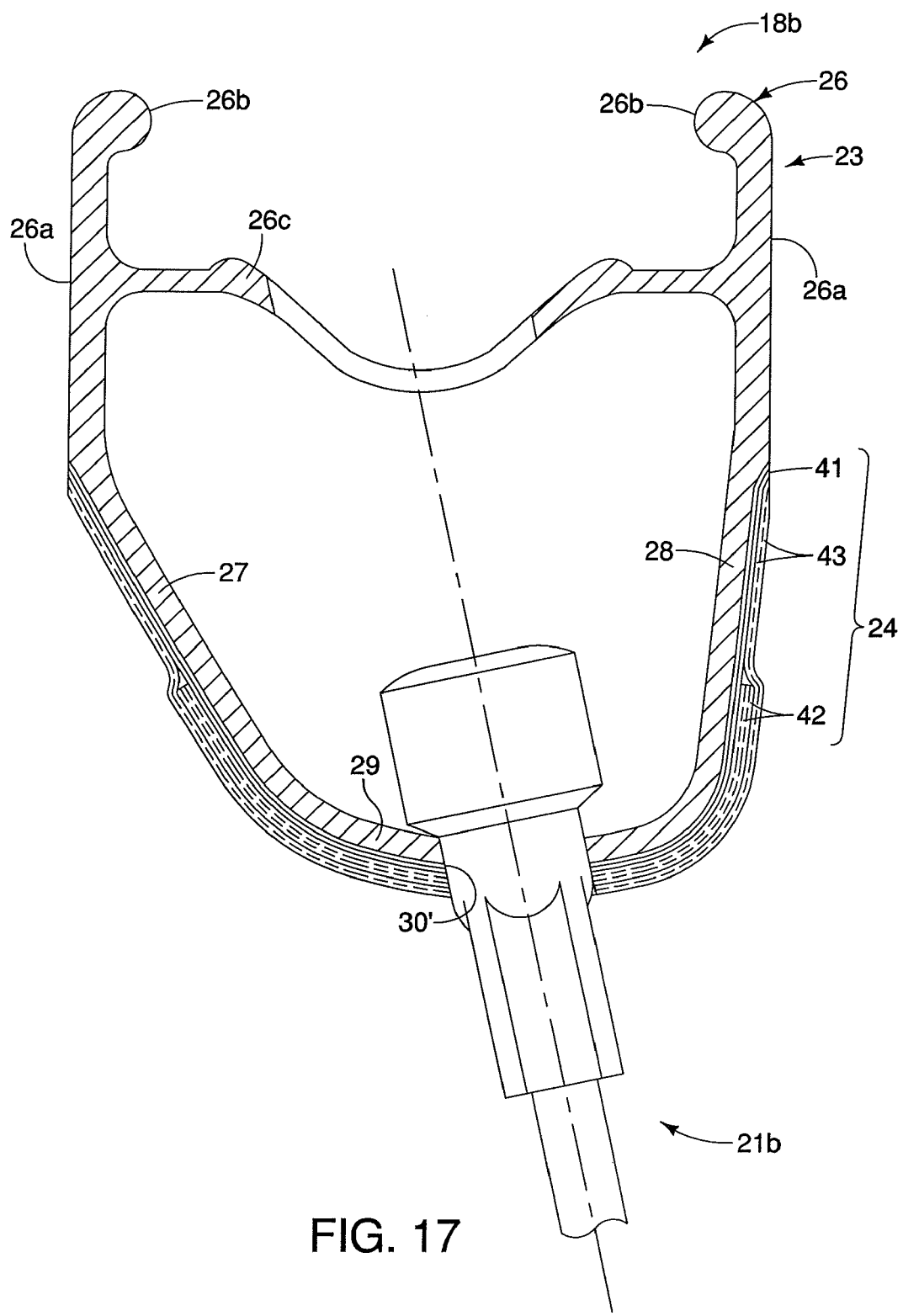
FIG. 17 is an enlarged cross sectional view of the rear rim for the rear wheel as seen along section line 17-17 of FIG. 3, showing one of the spokes attached to the rear rim.

Now, the heat shrink wrap material is removed to expose the reinforcing resin member 24 that has been bonded the annular metallic rim member 23 at the plurality of discrete locations around the annular metallic rim member 23 as well as the intermediate areas. Next, the spoke attachment openings 30 are enlarged from an initial size of about 2.9 millimeter to about 5.0 millimeters, as best shown in FIGS. 16 and 17. Thus, the enlarged spoke attachment openings 30' are formed by drilling/punching through the reinforcing resin member 24 and the inner annular wall portion 29 at the existing spoke attachment openings 30, as shown in FIG. 20J. A drill is illustrated as one example of a tool that could be used to form the enlarged spoke attachment openings 30'. In other words, it will be apparent to one skilled in the art from this disclosure that other methods of forming the enlarged spoke attachment openings 30' in the reinforcing resin member 24 and the inner annular wall portion 29 at locations that correspond to the initial spoke attachment openings 30 could be utilized. Once the enlarged spoke attachment openings 30' have been formed, the rim 18a is ready to be attached to the hub 20a by the spokes 21a and the spoke nipples in a conventional manner.

Figure 21:
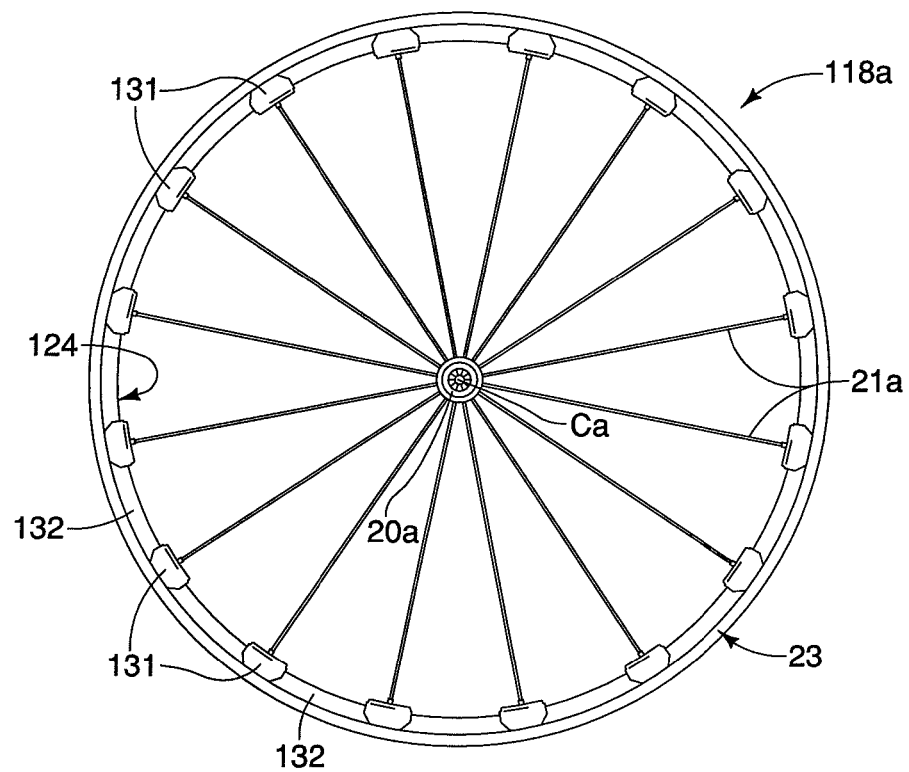
FIG. 21 is a side elevational view of a front wheel in accordance with a second embodiment of the present invention.
Figure 22:
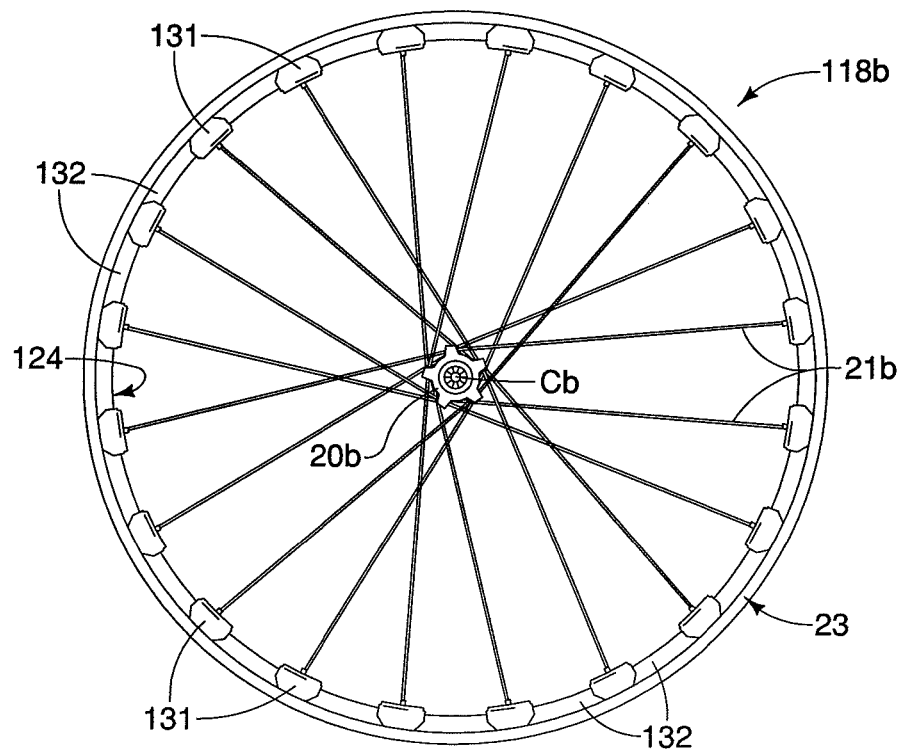
FIG. 22 is a side elevational view of a rear wheel in accordance with the second embodiment of the present invention.
Figure 23:
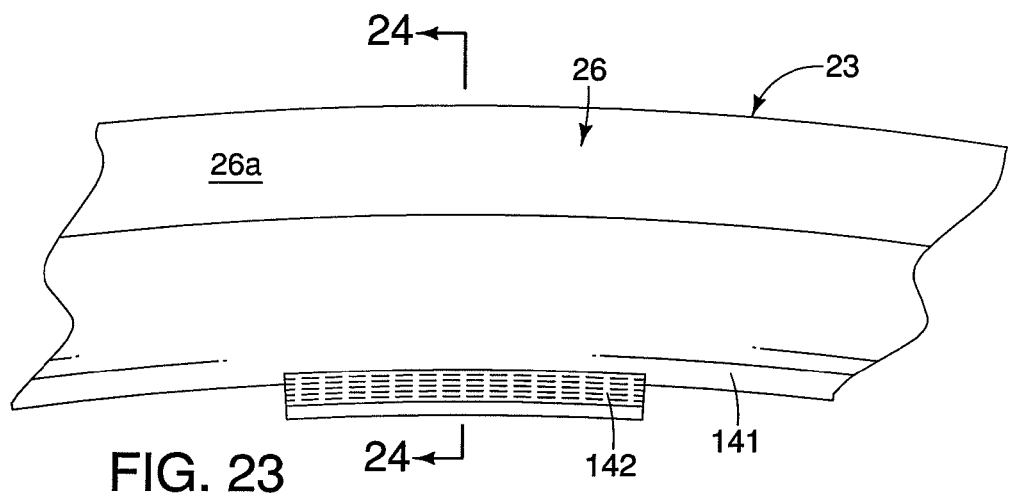
FIG. 23 is a partial side elevational view of the front rim illustrated in FIG. 21, with the continuous circumferential part of the reinforcing member and the inner segment parts of the reinforcing member applied thereto, but prior to application of the outer segment parts of the reinforcing member.
Figure 24:
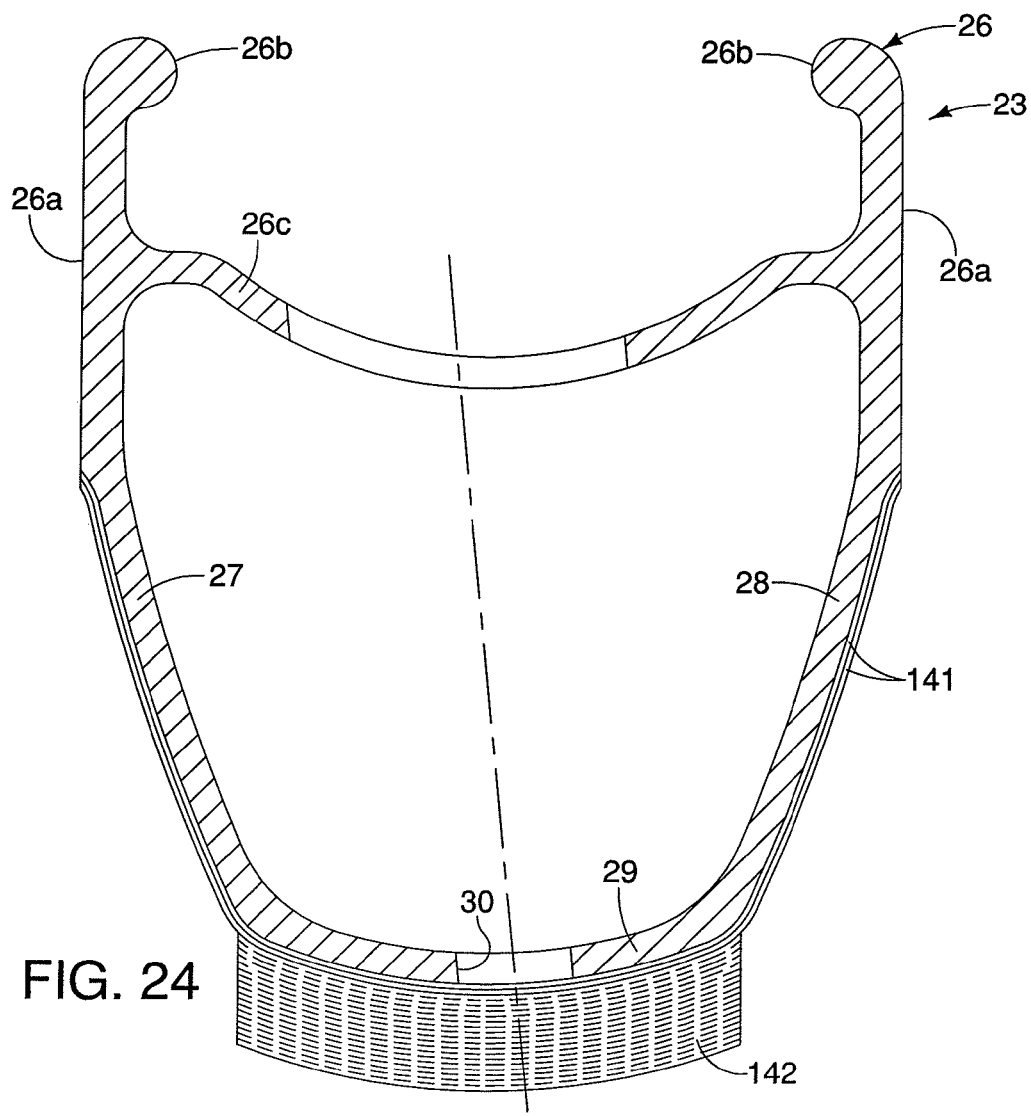
FIG. 24 is an enlarged cross sectional view of the metallic rim member with the continuous circumferential part of the reinforcing member and the inner segment parts of the reinforcing member applied thereto, as seen along section line 24-24 of FIG. 23.
Figure 25:
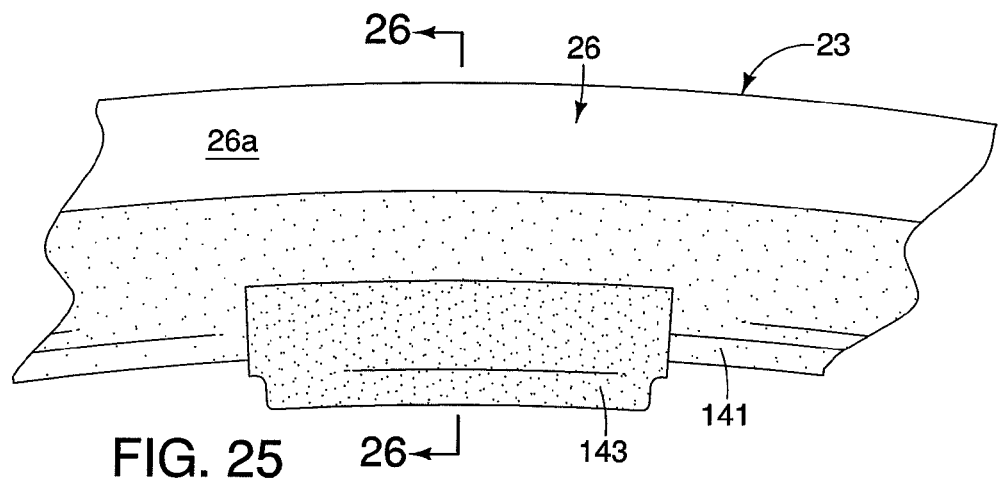
FIG. 25 is a partial side elevational view of the front rim illustrated in FIG. 21, with the continuous circumferential part of the reinforcing member, the inner segment parts and the outer segment parts of the reinforcing member applied thereto.
Figure 26:
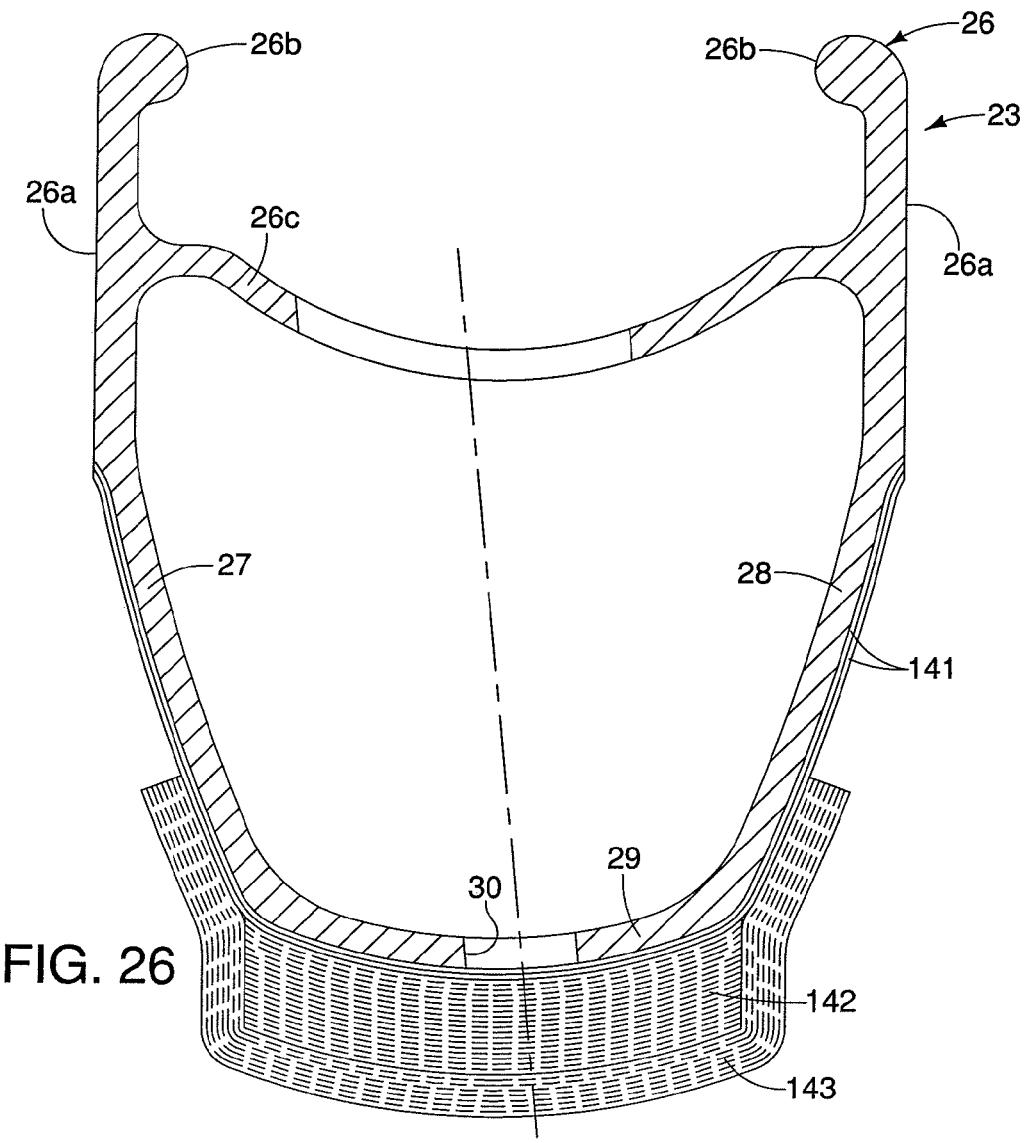
FIG. 26 is an enlarged cross sectional view of the metallic rim member with the continuous circumferential part of the reinforcing member and the inner segment parts and the outer segment parts of the reinforcing member applied thereto, as seen along section line 26-26 of FIG. 25.
Figure 27:
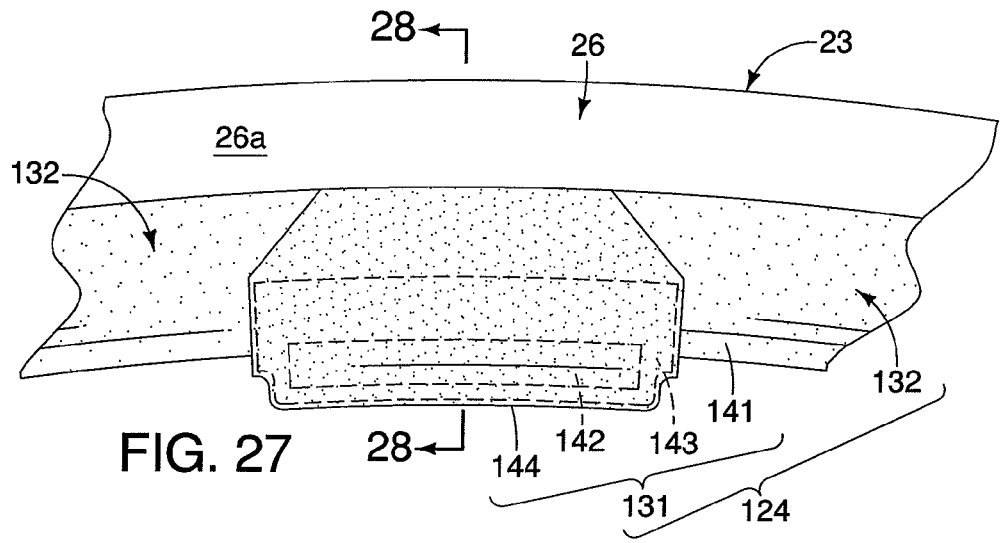
FIG. 27 is a partial side elevational view of the front rim illustrated in FIG. 21, with the continuous circumferential part of the reinforcing member, the three segment parts of the reinforcing member applied thereto.
Figure 28:
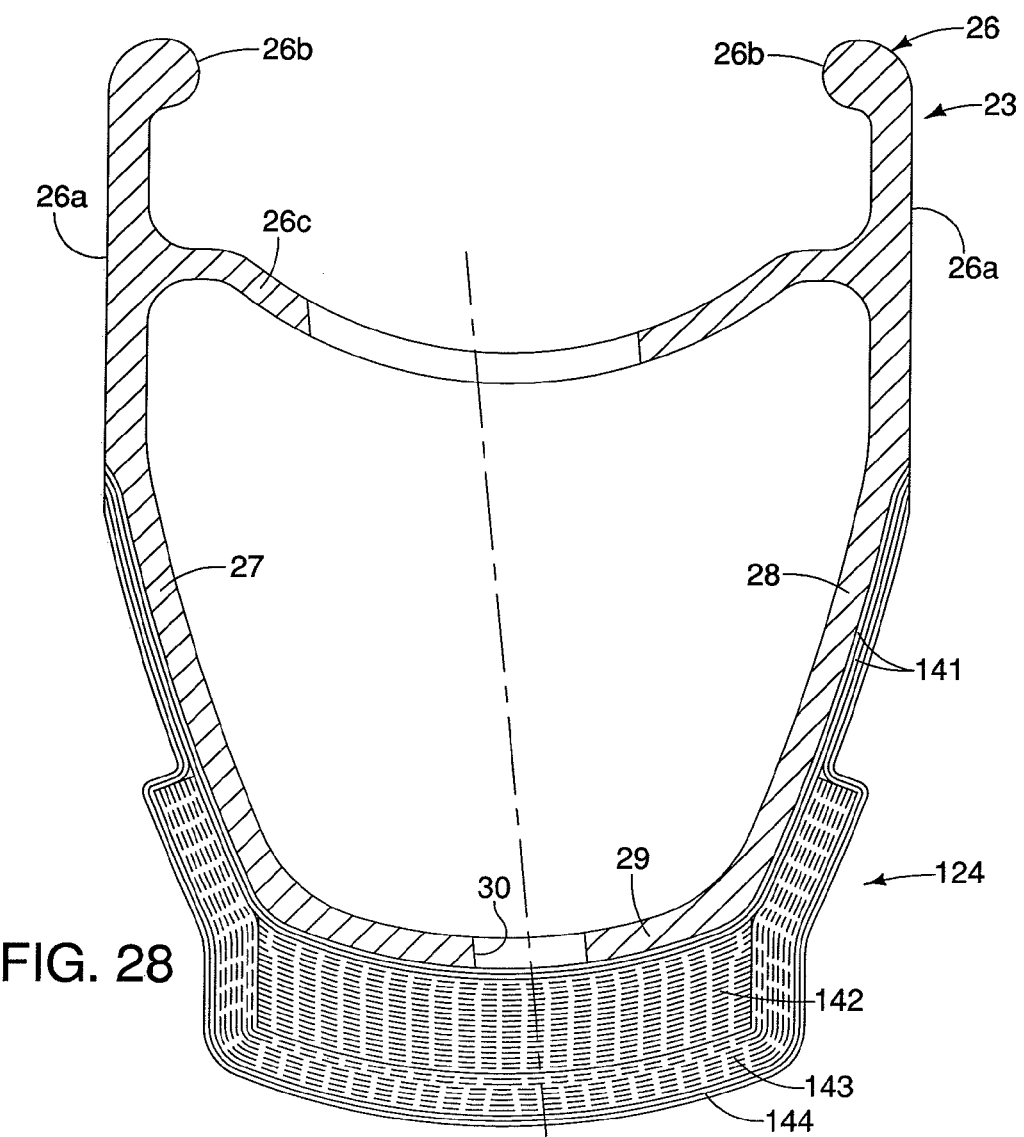
FIG. 28 is an enlarged cross sectional view of the metallic rim member with the continuous circumferential part of the reinforcing member and the three segment parts of the reinforcing member applied thereto, as seen along section line 28-28 of FIG. 27.

Referring now to FIGS. 21 and 22, a front annular rim 118a and a rear annular rim 118b are illustrated in accordance with a second embodiment of the present invention. Generally, the present invention is applied in the same manner to both of the front and rear annular rims 118a and 118b. For the sake of simplicity and convenience, the identical parts and functionally identical parts of the front and rear annular rims 118a and 118b will be given the same reference numerals as the first embodiment. Thus, similar to the first embodiment, the front annular rim 118a has the center hub 20a attached thereto by the spokes 21a that extends between the center hub 20a and the front annular rim 118a. Similarly, the rear annular rim 118b has the center hub 20b attached thereto by the spokes 21a that extends between the center hub 20b and the rear annular rim 118b, similar to the first embodiment. The rear annular rim 118b is identical to the front annular rim 118a, except that their cross-sectional profiles are different, similar to the first embodiment. In view of the similar construction of the rims 118a and 118b, only the front annular rim 118a will be discussed and illustrated in detail herein. It will be apparent to those skilled in the art form this disclosure that the construction of the front annular rim 118a as discussed and illustrated herein applies to the construction of the rear annular rim 118b.

The rim 118a basically includes the annular metallic rim member 23 of the first embodiment, but with a modified reinforcing resin member 124 applied to the annular metallic rim member 23. The reinforcing resin member 124 is formed of a plurality of layers of fiber reinforced resin/plastic (prepeg) sheets to form a plurality of reinforced spoke attachment areas as discussed below.

The reinforcing resin member 124 is attached to the annular metallic rim member 23 such that the reinforcing resin material continuously extends from the first annular side wall portion 27 across the inner annular wall portion 29 to the second annular side wall portion 28 to overlie exterior surface areas of the first and second annular side wall portions 27 and 28 and exterior surface areas of the inner annular wall portion 29 around the spoke attachment openings 30. In the illustrated embodiment, the reinforcing resin member 124 effectively increases the thickness of the annular metallic rim member 23 about the entire circumference of the rim 118a to provide rigid reinforcement to the rim 118a.

When the reinforcing resin member 124 is applied to the annular metallic rim member 23, the thickness of the inner annular wall portion 29 at the spoke attachment openings 30 is increased by a first amount to form a plurality of thick spoke attachment sections 131 and a second smaller amount in intermediate areas to form thinner intermediate sections 132 disposed between adjacent pairs of the spoke attachment sections 131. Thus, the reinforcing member 124 varies in thickness about the inner portion of the annular metallic rim member 23 so as to include a plurality of the thick spoke attachment sections 131 overlying the spoke attachment areas, respectively, and a plurality of the thinner intermediate sections 132 disposed between adjacent pairs of the thick spoke attachment sections 131 in an alternating manner. In other words, the spoke attachment sections 131 of the reinforcing resin member 124 are thicker than the intermediate sections 132 of the reinforcing resin member 24. While only one of the spoke attachment openings 30 is illustrated in each of the spoke attachment areas with the reinforcing resin member 24, it will be apparent to those skilled in the art from this disclosure that each of the spoke attachment areas can have more than one spoke attachment opening as needed and/or desired.

In particular, as seen in the illustrated embodiment of FIGS. 23-28, the reinforcing resin member 124 is basically includes a plurality of first resin sheets 141, a plurality of second resin sheets 142, a plurality of third resin sheets 143 and a plurality of fourth resin sheets 144. The first resin sheets 141 extend continuously about the entire circumference of the annular metallic rim member 23. Preferably, the first resin sheets 141 extend between the braking surfaces 26a such that the braking surfaces 26a are exposed (i.e., not covered by the first resin sheets 141). In other words, the first resin sheets 141 completely cover the exterior surface areas of the annular side wall portion 27 and 28 below the braking surfaces 26a and the exterior surface areas of the inner annular wall portion 29. The first resin sheets 141 are formed of a plurality of individually discrete sheets that are secured to the exterior surface areas of the annular side wall portion 27 and 28 below the braking surfaces 26a and the exterior surface areas of the inner annular wall portion 29. The first resin sheets 141 are secured directly to the annular metallic rim member 23. However, the first resin sheets 141 could be omitted or applied over the second, third and fourth resin sheets 142, 143 and 144. If the first resin sheets 141 are omitted, the resin sheets 142, 143 and 144 can be considered first second and third resin sheets 142, 143 and 144, respectively. Moreover, even if the resin sheets 141 are not omitted, the resin sheets 141 can be considered base resin sheets (if applied below the resin sheets 142, 143 and 144) or outer resin sheets (if applied over the resin sheets 142, 143 and 144), and the resin sheets 142, 143 and 144 can be considered first, second and third resin sheets 142, 143 and 144, respectively.

In the illustrated embodiment, two of the first resin sheets 141 are applied directly to the annular metallic rim member 23. Preferably, the first resin sheets 141 are prepreg sheets with the carbon fibers extending at forty-five degree angles with respect to its length around the inner circumference of the annular metallic rim member 23. Also the carbon fibers of one of the first resin sheets 141 extends in an opposite direction to the carbon fibers of the other one of the first resin sheets 141 so that the carbon fibers cross each other at ninety degrees with each other. The first resin sheets 141 are applied to the annular metallic rim member 23 in a first step by heating the first resin sheets 141 for about twenty minutes at 25° C. to 80° C.

The second resin sheets 142 are formed of a plurality of individually discrete sheets that are secured to the annular metallic rim member 23 at each of the spoke attachment openings 30 to overlie primarily overlie the discrete exterior surface areas of the inner annular wall portion 29 at each of the spoke attachment openings 30. The second resin sheets 142 are secured directly to the first resin sheets 141. However, the second resin sheets 142 could be secured directly to the annular metallic rim member 23 if the first resin sheets 141 were omitted. Specifically, for an average bicycle wheel, the second resin sheets 142 are preferably rectangular sheets that measure 20 mm in the circumferential direction by 12 mm in the radial/axial direction. Preferably, the second resin sheets 142 are secured to the first resin sheets 141 after the first resin sheets 141 have been secured to the annular metallic rim member 23.

In the illustrated embodiment, eighteen of the second resin sheets 142 are directly applied to the first resin sheets 141. Preferably, the second resin sheets 142 are prepreg sheets with the carbon fibers extending at ninety degree angles with respect to its length around the inner circumference of the annular metallic rim member 23. The second resin sheets 142 are applied to the annular metallic rim member 23 in a second step by heating the second resin sheets 142 for about twenty minutes at 80° C.

The third resin sheets 143 are similar to the second resin sheets 142, but are larger. The third resin sheets 143 are formed of a plurality of individually discrete sheets that are secured to the annular metallic rim member 23 at each of the spoke attachment openings 30 to overlie portions of the exterior surface areas of the annular side wall portion 27 and 28 and the exterior surface areas of the inner annular wall portion 29 at each of the spoke attachment openings 30. Thus, the third resin sheets 143 completely cover the second resin sheets 142 and partially contact the outermost sheet of the first resin sheets 141. The third resin sheets 143 are secured to the first and second resin sheets 141 and 142 after the first and second resin sheets 141 and 142 have been secured to the annular metallic rim member 23. Preferably, the third resin sheets 143 are rectangular sheets that measure 24 mm in the circumferential direction by 20 mm in the radial/axial direction. Thus, the third resin sheets 143 are preferably larger than the second resin sheets 42 in both the circumferential direction and the radial/axial direction. More specifically, the third resin sheets 143 are secured to the first resin sheets 141 in the areas where the third resin sheets 143 extend beyond the second resin sheets 142.

In the illustrated embodiment, eight of the third resin sheets 143 are directly applied to the first and second resin sheets 141 and 142. Preferably, the third resin sheets 143 are prepreg sheets with the carbon fibers extending at ninety degree angles with respect to its length around the inner circumference of the annular metallic rim member 23. The third resin sheets 143 are applied to the annular metallic rim member 23 in a third step by heating the third resin sheets 143 for about twenty minutes at 80° C. to 135° C.

The fourth resin sheets 144 are larger than the second and third resin sheets 142 and 143 so as to completely cover the second and third resin sheets 142 and 143. Thus, the fourth resin sheets 144 completely cover the third resin sheets 143 and partially contact the outermost sheet of the first resin sheets 141. The fourth resin sheets 144 are formed of a plurality of individually discrete sheets that are secured to the annular metallic rim member 23 at each of the spoke attachment openings 30 to overlie portions of the exterior surface areas of the annular side wall portion 27 and 28 and the exterior surface areas of the inner annular wall portion 29 at each of the spoke attachment openings 30. The fourth resin sheets 144 are secured to the first and third resin sheets 141 and 143 after the first, second and third resin sheets 141, 142 and 143 have been secured to the annular metallic rim member 23. Preferably, the fourth resin sheets 144 are measure 46 mm in the circumferential direction by 40 mm in the radial/axial direction. Thus, the fourth resin sheets 144 are preferably larger than the third resin sheets 143 in both the circumferential direction and the radial/axial direction. More specifically, the fourth resin sheets 144 are secured to the first resin sheets 141 in the areas where the fourth resin sheets 144 extend beyond the third resin sheets 143.

In the illustrated embodiment, two of the fourth resin sheets 144 are directly applied to the first and third resin sheets 141 and 143. Preferably, the fourth resin sheets 144 are prepreg sheets with the carbon fibers extending at forty-five degree angles with respect to its length around the inner circumference of the annular metallic rim member 23. Also the carbon fibers of one of the fourth resin sheets 144 extends in an opposite direction to the carbon fibers of the other one of the fourth resin sheets 144 so that the carbon fibers cross each other at ninety degrees with each other. The fourth resin sheets 144 are applied to the annular metallic rim member 23 in a fourth step by heating the fourth resin sheets 144 for about seventy minutes at 135° C.

The first, second, third and fourth resin sheets 141, 142, 143 and 144 form the spoke attachment sections 131 of the reinforcing member 124, while the first resin sheets 141 form the intermediate sections 132 of the reinforcing member 124. Accordingly, the reinforcing member 124 includes a reinforcing resin material that extends continuously in a circumferential direction about an entire circumferential area of the annular metallic rim member 23 with the thick sections spoke attachment sections 131 surrounding the areas about the spoke attachment openings 30.

In one example of the present invention, the reinforcing resin member 124 includes two of the first resin sheets 141 constituting a continuous circumferential part of the reinforcing member 124 having at least two individual reinforcing layers bonded together, eighteen of the second resin sheets 142, eight of the third resin sheets 143 and two of the fourth resin sheets 144 constituting the spoke attachment sections 131 having a plurality of individual reinforcing layers bonded together over the continuous circumferential part at circumferentially spaced apart locations. In other words, the second resin sheets 142, the third resin sheets 143 and the fourth resin sheets 144 are a plurality of individual or discrete sections that are circumferentially spaced apart about the annular metallic rim member 23 that corresponds to the spoke attachment openings 30.

Preferably, the resin sheets 141, 142, 143 and 144 are fiber reinforced resin/plastic sheets that include epoxy with one or more carbon fiber impregnated layers. The fiber impregnated resin sheets 141, 142, 143 and 144 are melted together to form a plurality of integrated one-piece reinforcements.

In the illustrated embodiment, the first, second, third and fourth resin sheets 141, 142, 143 and 144 of the reinforcing resin member 124 are all preferably formed as fiber reinforced sheets embedded with resin/plastic. Thus, the rim 118*a* is a composite rim made of both metallic and nonmetallic materials. The reinforcing resin member 124 is directly bonded to the annular metallic rim member 23. While heat is used to apply the first, second, third and fourth resin sheets 141, 142, 143 and 144, the heat is lower than a temperature that would physical alter the metallic material of the annular metallic rim member 23.

The first, second, third and fourth resin sheets 141, 142, 143 and 144 in this embodiment are preferably thin sheets of continuous reinforcement fibers impregnated with a thermoset resin or a thermoplastic resin, which are often called prepreg sheets. The first, second, third and fourth resin sheets 141, 142, 143 and 144 (prepreg sheets) are soft material at room temperature. However, when the first, second, third and fourth resin sheets 141, 142, 143 and 144 (prepreg sheets) are heated, the resin once becomes low viscosity. However, after heating, the resin of the resin sheets 41, 42 and 43 becomes very hard.

In one preferred embodiment, the first, second, third and fourth resin sheets 141, 142, 143 and 144 (prepreg sheets) include carbon fibers or a glass fiber impregnated with an epoxy resin. In other preferred embodiments, the resin sheets 41, 42 and 43 (prepreg sheets) can include virtually any reinforcement fiber, with virtually any matrix resin that can carry out the present invention. The thickness and surface finish of the first, second, third and fourth resin sheets 141, 142, 143 and 144 (prepreg sheets) can be varied to suit the desired requirements of the wheel. In this embodiment, two of the resin sheets 141, are illustrated as being used to cover an entire circumferential section of the inner annular wall portion 29. However, the number of the resin sheets 141 will depend on a number of factors. Likewise, the number of the resin sheets 142, 143 and 144 will depend on a number of factors. Thus, number of the first, second, third and fourth resin sheets 141, 142, 143 and 144 are shown just for purposes of illustration of one suitable arrangement (i.e., the actual number of sheets can be more or less than shown depending on a number of factors).

Basically, the first, second, third and fourth resin sheets 141, 142, 143 and 144 are applied in the same manner as illustrated in FIGS. 20A to 20J, except that an additional step to apply an additional layer (the second resin sheets 142). Thus, in manufacturing the rim 118a, first, the annular metallic rim member 23 is formed utilizing conventional rim manufacturing techniques as mentioned above in the first embodiment. Once the annular metallic rim member 23 is formed, the reinforcing resin member 24 is applied to the annular metallic rim member 23 in several stages or steps. Preferably, the first sheets 141 are first applied continuously in a circumferential direction about an entire circumferential area of the annular metallic rim member 23, as illustrated in FIGS. 20A and 20B. Then the first sheets 141 are preferably trimmed using a conventional cutting/grinding tool (only diagrammatically illustrated) to remove excess material, as shown in FIG. 20C. Preferably, the second, third and fourth sheets 142, 143 and 144 are then applied at a plurality of discrete locations where the spoke attachment openings 30 are located in three individual steps. In this embodiment, thirty resin sheets (e.g. two of the first sheets 141, eighteen of the second sheets 142, eight of the third resin sheets 143 and two of the fourth sheets 144) overlie the areas surrounding the spoke attachment openings 30, while only two of the resin sheets 141 overlie the intermediate areas. However, the number of sheets is not always illustrated herein for sake of simplicity.

Once the sheets 141, 142, 143 and 144 are secured to the metallic rim member 23, the spoke attachment openings 30 are enlarged from an initial size of about 2.9 millimeter diameter to about 5.0 millimeters.

The application of each set of the resin sheets 141, 142, 143 and 144 is preferably accomplished by applying a heat shrink wrap material (not shown) over the resin sheets 141, 142, 143 and 144 in each of the stages or steps. Preferably, the heat shrink wrap material is a tape that is spirally wound around the entire circumference of the annular metallic rim member 23 with a slight overlap between adjacent coils. Then heat H is applied to the heat shrink wrap material such that the heat shrink wrap material 50 firmly presses the resin sheets 141, 142, 143 and 144 against and the wall portions 27, 28 and 29. This application of the heat to the heat shrink wrap material also causes the resin of the resin sheets 141, 142, 143 and 144 to melt, and thus, adhere to the metallic rim member 23 or one or more of the prior resin sheets.

Preferably, the heat H is applied such that the annular metallic rim member 23 with the reinforcing resin member 24 is heated to between about 80° C. to about 150° C., preferably about 130° C. The heating temperature is selected based on the material(s) of the reinforcing resin member 124 (e.g., the sheets 141, 142, 143 and 144) and the annular metallic rim member 23. Specifically, the heating temperature is selected such that the reinforcing resin member 124 will melt/adhere to the annular metallic rim member 23, but also such that the physical properties of the annular metallic rim member 23 will not be altered by the heat H (temperature) needed to melt/adhere the reinforcing resin member 124 thereto. Of course, it will be apparent to those skilled in the art from this disclosure that the heating temperature and/or heating time may vary depending the exact materials used for the reinforcing resin member 124 and the annular metallic rim member 23.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A bicycle rim comprising:
an annular metallic rim member including a pair of oppositely facing annular braking surfaces and a plurality of spoke attachment areas with at least one spoke attachment opening formed in each of the spoke attachment areas; and
a non-metallic reinforcing member overlying an exterior surface of the annular metallic rim member but not overlying the pair of oppositely facing annular braking surfaces, the reinforcing member including a plurality of spoke attachment sections individually arranged in a circumferential direction to overlie the spoke attachment openings, each of the spoke attachment sections including
- a plurality of discrete non-metallic first reinforcing parts attached to one of the spoke attachment areas around the spoke attachment openings, and
- a plurality of discrete non-metallic second reinforcing parts attached to the one of the spoke attachment areas to overlie the non-metallic first reinforcing parts, with the non-metallic second reinforcing parts being larger than the non-metallic first reinforcing parts such that the non-metallic second reinforcing parts extend radially outwardly beyond radially outer most edges of the non-metallic first reinforcing parts.

2. The bicycle rim according to claim 1, wherein the reinforcing member includes a reinforcing resin material.

3. The bicycle rim according to claim 1, wherein
the annular metallic rim member includes an annular tire attachment portion adapted to have a tire mounted thereon, a first annular side wall portion, a second annular side wall portion and an inner annular wall portion connecting the first and second annular side wall portions with the spoke attachment openings being formed in the inner annular wall portion.

4. The bicycle rim according to claim 1, wherein
the discrete non-metallic first reinforcing parts overlie an inner most annular portion of the annular metallic rim member.

5. The bicycle rim according to claim 1, wherein
a number of the discrete non-metallic second reinforcing parts attached to each spoke attachment area is smaller than a number of the discrete non-metallic first reinforcing parts attached to each spoke attachment area.

6. The bicycle rim according to claim 1, wherein
the annular metallic rim member has a uniform cross-sectional profile about its entire circumference, except that material has been removed to form a plurality of holes including the spoke attachment openings.

7. A bicycle rim comprising:
an annular metallic rim member including a pair of oppositely facing annular braking surfaces and a plurality of spoke attachment areas with at least one spoke attachment opening formed in each of the spoke attachment areas; and
a non-metallic reinforcing member overlying an exterior surface of the annular metallic rim member but not overlying the pair of oppositely facing annular braking surfaces, the reinforcing member including a plurality of spoke attachment sections individually arranged in a circumferential direction to overlie the spoke attachment openings, the spoke attachment sections including
- a plurality of discrete non-metallic first reinforcing parts attached to the spoke attachment areas around the spoke attachment openings,
- a plurality of discrete non-metallic second reinforcing parts attached to the spoke attachment areas to overlie the non-metallic first reinforcing parts, with the non-metallic second reinforcing parts being larger than the non-metallic first reinforcing parts, and
- a circumferential part overlying at least a portion of the spoke attachment areas and overlying circumferential areas of the rim disposed between the spoke attachment areas.

8. The bicycle rim according to claim 7, wherein
the first and second reinforcing parts exteriorly overlie the circumferential part.

9. The bicycle rim according to claim 8, wherein
the circumferential part is formed of at least two individual reinforcing layers bonded together, and the first and second reinforcing parts are formed by a plurality of individual reinforcing layers bonded together over the circumferential part at circumferentially spaced apart locations.

10. The bicycle rim according to claim 9, wherein
the reinforcing member includes a reinforcing resin material having epoxy with one or more carbon impregnated layers.

11. A bicycle rim comprising:
an annular metallic rim member including a pair of oppositely facing annular braking surfaces and a plurality of spoke attachment areas with at least one spoke attachment opening formed in each of the spoke attachment areas; and
a non-metallic reinforcing member overlying an exterior surface of the annular metallic rim member but not overlying the pair of oppositely facing annular braking surfaces, the reinforcing member including a plurality of spoke attachment sections individually arranged in a circumferential direction to overlie the spoke attachment openings, the spoke attachment sections including
- a plurality of discrete non-metallic first reinforcing parts attached to the spoke attachment areas around the spoke attachment openings, and
- a plurality of discrete non-metallic second reinforcing parts attached to the spoke attachment areas to overlie the non-metallic first reinforcing parts, with the non-metallic second reinforcing parts being larger than the non-metallic first reinforcing parts,
the reinforcing member including a reinforcing resin material extending continuously in a circumferential direction about an entire circumferential area of the annular metallic rim member.

12. A bicycle rim comprising:
an annular metallic rim member including a pair of oppositely facing annular braking surfaces and a plurality of spoke attachment areas with at least one spoke attachment opening formed in each of the spoke attachment areas; and
a non-metallic reinforcing member overlying an exterior surface of the annular metallic rim member but not overlying the pair of oppositely facing annular braking surfaces, the reinforcing member including a plurality of spoke attachment sections individually arranged in a circumferential direction to overlie the spoke attachment openings, the spoke attachment sections including
- a plurality of discrete non-metallic first reinforcing parts attached to the spoke attachment areas around the spoke attachment openings, and
- a plurality of discrete non-metallic second reinforcing parts attached to the spoke attachment areas to overlie the non-metallic first reinforcing parts, with the non-metallic second reinforcing parts being larger than the non-metallic first reinforcing parts,
each of the first reinforcing parts having a predetermined first circumferential dimension smaller than a second circumferential dimension of the second reinforcing parts and a predetermined first radial dimension smaller than a second radial dimension of the second reinforcing parts.

13. A bicycle rim comprising:
an annular metallic rim member including a plurality of spoke attachment areas with at least one spoke attachment opening in each of the spoke attachment areas; and a reinforcing member overlying an exterior surface of the annular metallic rim member, the reinforcing member including a plurality of spoke attachment sections individually arranged in a circumferential direction to overlie the spoke attachment openings, the spoke affachment sections including a plurality of discrete first reinforcing parts attached to the spoke attachment areas around the spoke attachment openings, a plurality of discrete second reinforcing parts attached to the spoke attachment areas to overlie the first reinforcing parts, with the second reinforcing parts being larger than the first reinforcing parts, and a plurality of discrete third reinforcing parts attached to the spoke attachment areas to overlie the first and second reinforcing parts, with the third reinforcing parts being larger than the first and second reinforcing parts, each of the third reinforcing parts having a predetermined third circumferential dimension larger than a second circumferential dimension of a corresponding one of the second reinforcing parts, and each of the third reinforcing parts having a predetermined third radial dimension larger than a second radial dimension of the corresponding one of the second reinforcing parts.

14. A bicycle rim comprising:

an annular metallic rim member including a pair of oppositely facing annular braking surfaces and a plurality of spoke attachment areas with at least one spoke attachment opening formed in each of the spoke attachment areas; and a non-metallic reinforcing member overlying an exterior surface of the annular metallic rim member but not overlying the pair of oppositely facing annular braking surfaces, the reinforcing member including a plurality of spoke attachment sections individually arranged in a circumferential direction to overlie the spoke attachment openings, the spoke attachment sections including a plurality of discrete non-metallic first reinforcing parts attached to the spoke attachment areas around the spoke attachment openings, and a plurality of discrete non-metallic second reinforcing parts attached to the spoke attachment areas to overlie the non-metallic first reinforcing parts, with the non-metallic second reinforcing parts being larger than the non-metallic first reinforcing parts, each of the spoke attachment sections of the reinforcing member having an overall maximum thickness in a range of about 1 millimeter to about 2 millimeters.

15. A bicycle rim forming method comprising:

forming an annular metallic rim member having a pair of oppositely facing annular braking surfaces and a plurality of spoke attachment areas; and applying a plurality of discrete non-metallic first reinforcing parts to exteriorly overlie each of the spoke attachment areas of the annular metallic rim member; and applying a plurality of discrete non-metallic second reinforcing parts to exteriorly overlie the non-metallic first reinforcing parts at each of the spoke attachment areas, with the non-metallic second reinforcing parts being larger than the non-metallic first reinforcing parts such that the non-metallic second reinforcing parts extend radially outwardly beyond radially outer most edges of the non-metallic first reinforcing parts, the discrete non-metallic first and second reinforcing parts being applied to the annular metallic rim member so as not to overlie at least one of the annular braking surfaces.

16. The bicycle rim forming method according to claim 15, further comprising forming a plurality of spoke attachment openings in the spoke attachment areas of the annular metallic rim member and the non-metallic first and second reinforcing parts.

17. The bicycle rim forming method according to claim 15, further comprising applying a continuous circumferential part to exteriorly overlie the annular metallic rim member.

18. The bicycle rim forming method according to claim 17, wherein the non-metallic first reinforcing parts are applied to exteriorly overlie the continuous circumferential part.

19. The bicycle rim forming method according to claim 17, wherein the continuous circumferential part is applied to exteriorly overlie the non-metallic first and second reinforcing parts.

20. The bicycle rim forming method according to claim 15, wherein the discrete non-metallic second reinforcing parts are applied to the annular metallic rim so as to at least partially overlie one of the annular breaking surfaces, and the discrete non-metallic second reinforcing parts are trimmed after being applied to the annular metallic rim member such that the non-metallic discrete second reinforcing parts do not overlie either of the annular braking surfaces.

21. The bicycle rim forming method according to claim 15, wherein the discrete non-metallic first reinforcing parts are applied to the annular metallic rim member such that the discrete non-metallic first reinforcing parts overlie an inner most annular portion of the annular metallic rim member.

22. The bicycle rim forming method according to claim 15, wherein the annular metallic rim member is formed such that the annular metallic rim member has a uniform cross-sectional profile about its entire circumference.

23. The bicycle rim forming method according to claim 15, wherein a number of the discrete non-metallic second reinforcing parts applied to each spoke attachment area is smaller than a number of the discrete non-metallic first reinforcing parts attached to each spoke attachment area.

24. A bicycle rim comprising:

an annular metallic rim member including a plurality of spoke attachment areas with at least one spoke attachment opening in each of the spoke attachment areas; and a reinforcing member overlying an exterior surface of the annular metallic rim member, the reinforcing member including a plurality of spoke attachment sections individually arranged in a circumferential direction to overlie the spoke attachment openings, each of the spoke attachment sections including a plurality of discrete first reinforcing parts attached to one of the spoke attachment areas around the spoke attachment openings, a plurality of discrete second reinforcing parts attached to the one of the spoke attachment areas to overlie the first reinforcing parts, with the second reinforcing parts being larger than the first reinforcing parts, and a plurality of discrete third reinforcing parts attached to the one of the spoke attachment areas to overlie the first and second reinforcing parts, with the third reinforcing parts being larger than the first and second reinforcing parts, a number of the discrete second reinforcing parts attached to each spoke attachment area being smaller than a number of the discrete first reinforcing parts attached to each spoke attachment area.

25. The bicycle rim according to claim 24, wherein a number of the discrete third reinforcing parts attached to each spoke attachment area is smaller than the number of the discrete second reinforcing parts attached to each spoke attachment area.

26. A bicycle rim comprising:

an annular metallic rim member including a plurality of spoke attachment areas with at least one spoke attachment opening in each of the spoke attachment areas; and a reinforcing member overlying an exterior surface of the annular metallic rim member, the reinforcing member including a plurality of spoke attachment sections individually arranged in a circumferential direction to overlie the spoke attachment openings, each of the spoke attachment sections including a plurality of discrete first reinforcing parts attached to one of the spoke attachment areas around the spoke attachment openings, a plurality of discrete second reinforcing parts attached to the one of the spoke attachment areas to overlie the first reinforcing parts, with the second reinforcing parts being larger than the first reinforcing parts, and a plurality of discrete third reinforcing parts attached to the one of the spoke attachment areas to overlie the first and second reinforcing parts, with the third reinforcing parts being larger than the first and second reinforcing parts, a number of the discrete third reinforcing parts attached to each spoke attachment area being smaller than a number of the discrete second reinforcing parts attached to each spoke attachment area.

* * * * *